(12) United States Patent
Parkinson

(10) Patent No.: US 8,266,838 B2
(45) Date of Patent: Sep. 18, 2012

(54) FISHING LURE AND METHOD OF MANUFACTURING SAME

(75) Inventor: Edward J. Parkinson, Browndale, PA (US)

(73) Assignees: Edward J. Parkinson, Browndale, PA (US); Harold R. Mattes, Brooklyn, NY (US)

( * ) Notice: Subject to any disclaimer, the term of this patent is extended or adjusted under 35 U.S.C. 154(b) by 1084 days.

(21) Appl. No.: 12/180,962

(22) Filed: Jul. 28, 2008

(65) Prior Publication Data

US 2009/0255168 A1 Oct. 15, 2009

Related U.S. Application Data

(60) Provisional application No. 60/935,091, filed on Jul. 26, 2007.

(51) Int. Cl.
*A01K 85/00* (2006.01)

(52) U.S. Cl. ............ 43/42.25; 43/42.26; 43/42.24

(58) Field of Classification Search .......... 43/42.25, 43/42.26, 42.24, 42.1, 42.28
See application file for complete search history.

(56) References Cited

U.S. PATENT DOCUMENTS

| | | | | |
|---|---|---|---|---|
| 3,568,354 | A * | 3/1971 | Yacko | 43/17.6 |
| 6,003,264 | A * | 12/1999 | Hnizdor | 43/42.25 |
| 6,122,856 | A * | 9/2000 | Hnizdor | 43/42.25 |
| 6,219,955 | B1 * | 4/2001 | Hnizdor | 43/42.25 |
| 6,286,246 | B1 * | 9/2001 | Rachal et al. | 43/42.25 |

* cited by examiner

*Primary Examiner* — Christopher P Ellis
(74) *Attorney, Agent, or Firm* — Rothwell, Figg, Ernst & Manbeck, P.C.

(57) ABSTRACT

A fly-fishing fly and method of manufacturing the same are provided. The fly includes a unique abdomen. A method is provided for coloring and waterproofing the abdomen material, which allows it to transmit virtually all of the available light. The fly has a natural glow to it that is discernable to human eyes even after the sun has set. This fly represents a new approach to fly-fishing lures because it is substantially translucent and lifelike.

9 Claims, 28 Drawing Sheets

FISHING LURE AND METHOD OF MANUFACTURING SAME

CROSS-REFERENCE TO RELATED APPLICATIONS

Pursuant to 35 U.S.C. §119(e), this application claims the benefit of priority to U.S. Provisional Patent Application No. 60/935,091, which was filed on Jul. 26, 2007, the entire contents of which are incorporated herein by reference.

BACKGROUND OF THE INVENTION

1. Field of the Invention

The present invention relates generally to a fly-fishing fly and method of making it. More particularly, a method is provided for coloring and waterproofing the fly so that it transmits virtually all of the available light.

2. Description of the Related Art

Early records date fly-fishing back to at least 200 AD Rome. Records indicate that people were fly-fishing on the river Astracus in Macedonia with 6-foot rods having 6-foot lines and hooks baited with red wool and two rooster feathers. It is well known that by the 15th century, over fifty different fly patterns had been documented for catching carp, pike, catfish, burbot, salmon, and trout.

Early equipment differed much from modern fishing instruments. Rods were made by fusing branches of hazel, willow, or ash to branches of blackthorn, Crabtree, medlar or juniper. Fishing line was made from the longest, roundest, and best hairs from a white horse's tail. These hairs were twisted, plated, and bound together to produce a long line. Fly fishermen dyed their lines different colors for fishing different waters throughout the season. Fishing hooks were considered the most difficult equipment to produce, requiring at least seven specific tools and fine quality steel.

Fly-fishing equipment began to improve in the 18th century. Running rings were added to fishing rods and joined rods were invented. Reels also made an appearance this century. Brass winches emerged first, and the multiplying reel came into use shortly thereafter. In addition, it is believed that the first commercial fly production came into existence during the 18th century.

Significant improvements to fly-fishing came in the 19th century. Fly tying moved forward by advancing a wide color spectrum and varied materials. While most flies continued to be hand tied, more than 300 patterns were in use, including the winged wet fly and the fully-dressed salmon fly.

As leisure travel increased, the interest in fly-fishing kept pace, and with more fly fishermen on the water, new techniques began to emerge. The use of dry flies began in the mid-1800's and commercial production of dry flies began in 1954.

While fly-fishing has been around for nearly 2000 years, and significant improvements have been made, fly-fishing is still a challenging sport and there remains a need for new and improved fishing lures and methods of manufacturing the same.

For instance, natural insects, which most fly-fishing lures seek to imitate, are translucent and transmit and refract light uniquely. Trout and other game fish are attracted to this quality while feeding. The failure of other fly-fishing lures to successfully mimic natural translucence and light transmission explains the inconsistent and sub-standard results achieved by lures found in the prior art. Because the lures of the present invention successfully mimics the natural translucence and light transmission signature of various insects, fish make no distinction between real insects and the lure.

SUMMARY OF THE INVENTION

Further applications and advantages of various embodiments of the present invention are discussed below with reference to the drawing figures.

According to embodiments of the present invention, a fly-fishing fly and method of making it are provided.

According to an embodiment of the present invention, the fly includes a unique abdomen. A method is provided for coloring and waterproofing the abdomen material, which allows it to transmit virtually all of the available light. There is a natural glow to the fly that is discernable to human eyes even after the sun has set. This fly represents a new way approach to the age old problem of fly-fishing flies. Specifically, the fly of the current invention is substantially lifelike and translucent.

The present invention is applicable to the manufacture of well known flies such as, but not limited to, the Hendrickson Dun, Olive Dun, March Brown Dun, Gray Fox Dun, Brown Drake Dun, Sulphur Spinner, White Fly Spinner, Brown Drake Spinner, Green Drake Spinner, followed by photographs of the Sulphur Dun body and Olive Dun body, compared to traditional bodies for the same or similar fly.

DETAILED DESCRIPTION OF THE PREFERRED EMBODIMENTS

While the present invention may be embodied in many different forms, a number of illustrative embodiments are described herein, with the understanding that the present disclosure is to be considered as providing examples of the principles of the invention, and such examples are not intended to limit the invention to any specific preferred embodiments described and/or illustrated herein.

The photographs contained in FIGS. 2-28 show and describe the method of making the fly of this invention as well as the final construction of the fly.

Figure 1:
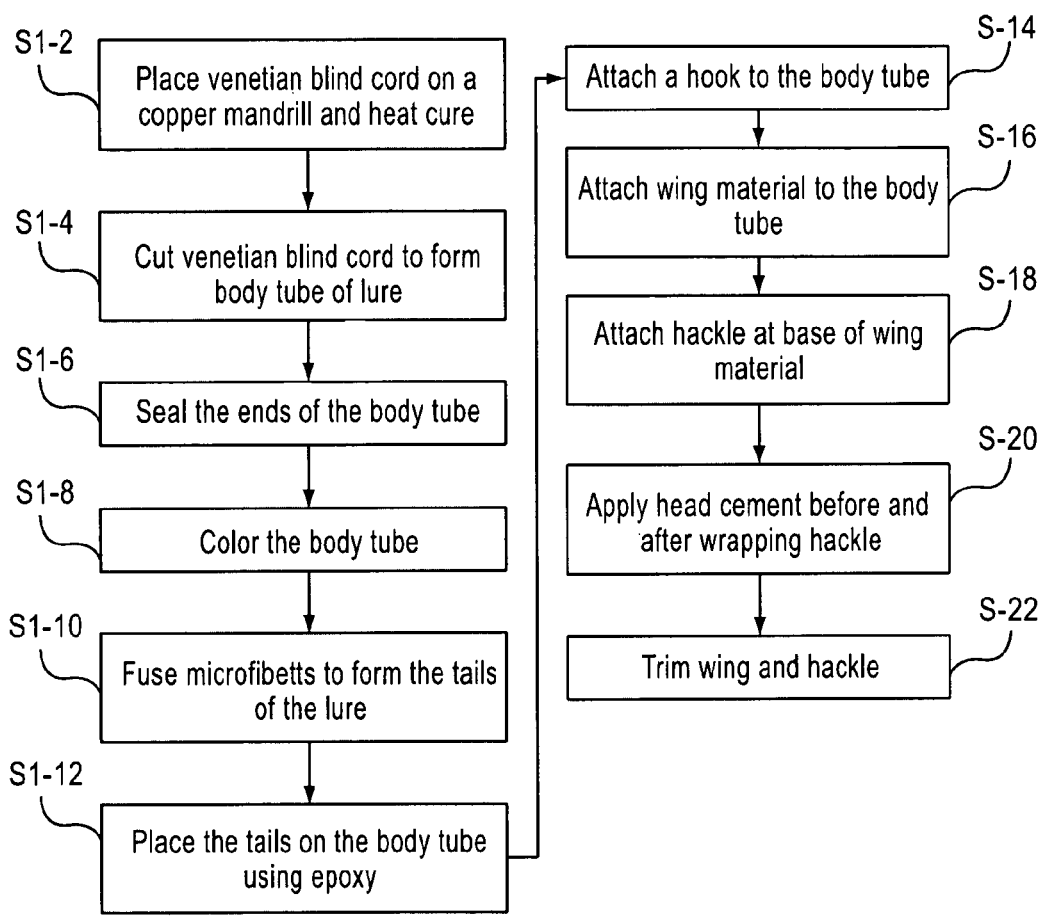
FIG. 1 is a flow diagram of a method of manufacturing a fishing lure according to one embodiment of the present invention.
Figure 2:
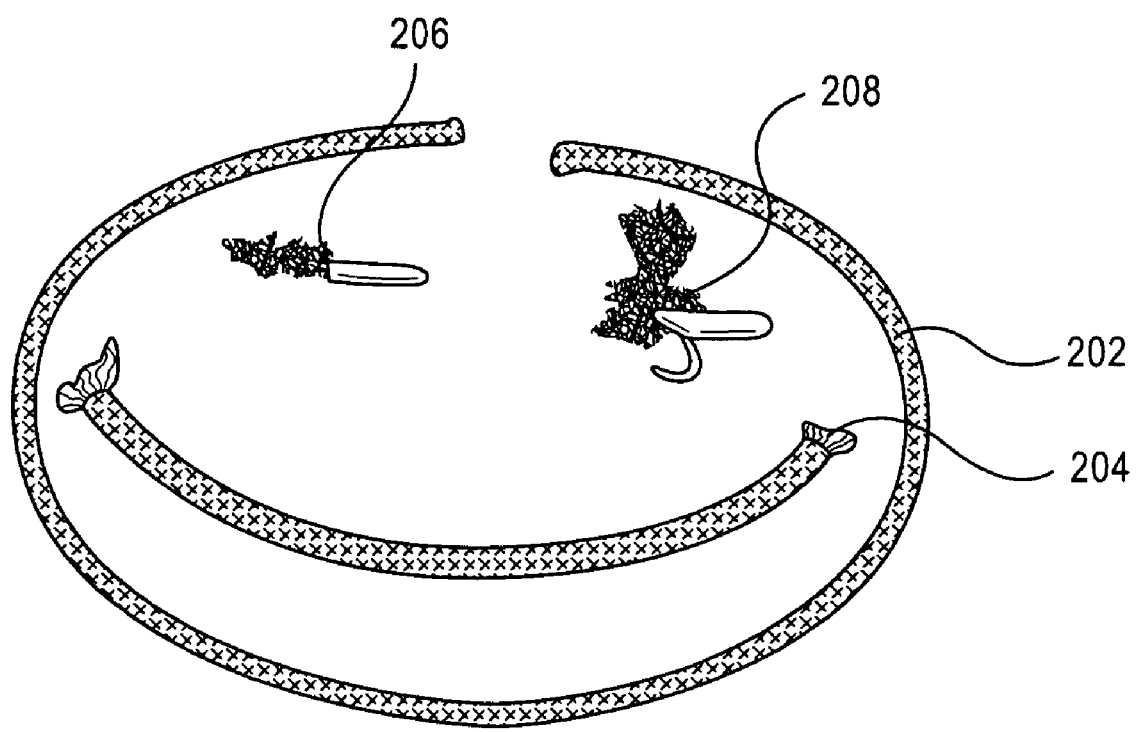
FIG. 2 is an image of venetian blind cord in two different diameters corresponding to the shown fishing lures.
Figure 3:
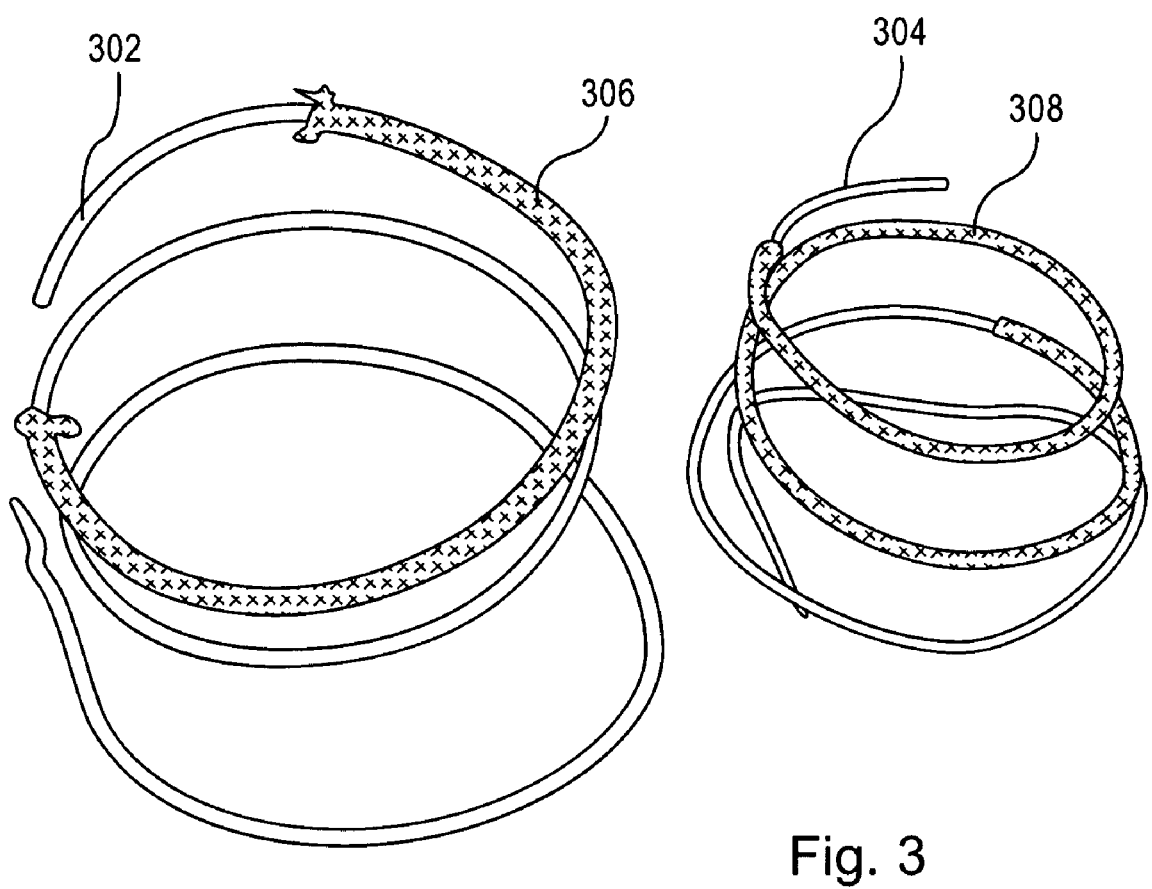
FIG. 3 is an image of heat cured venetian blind cord on a copper mandrill.

FIG. 1 is a flow diagram of a method of manufacturing a fishing lure according to one embodiment of the present invention. At step S1-2, the core of woven venetian blind cord or similar material, is removed and the cord shell is placed on a copper mandrill and heat cured. FIG. 2 shows cord material 202 and 204 along side flies 206 and 208 made according to the present invention. As shown in FIG. 3, cord material 306, 308 is place on a copper mandrel 302, 304, which may be made from heavy gauge copper wire or the like. As shown, the mandrel is curved or in a cork-screw like configuration. This step is used to create an up-curved body in the finished lure that better mimics the bodies of insects.

According to embodiments of the present invention, white woven hollow cord is preferably used so that the material transmits virtually all of the available light. This creates a natural glow to the fly that is discernable to human eyes even after the sun has set. Venetian blind cord material, for example, could be used, which can be made from woven or braided nylon, polyester, or other known materials. Material that will float, and that is resistant to water-logging, is preferred (e.g., material that has a specific gravity that is close to the specific gravity of the water). Additionally, venetian blind cord is produced in a variety of colors. While different colors may be better suited for different fishing environments, white will provide suitable luminescence. Additionally, the cord material may be custom dyed to achieve a specific color.

Figure 4:
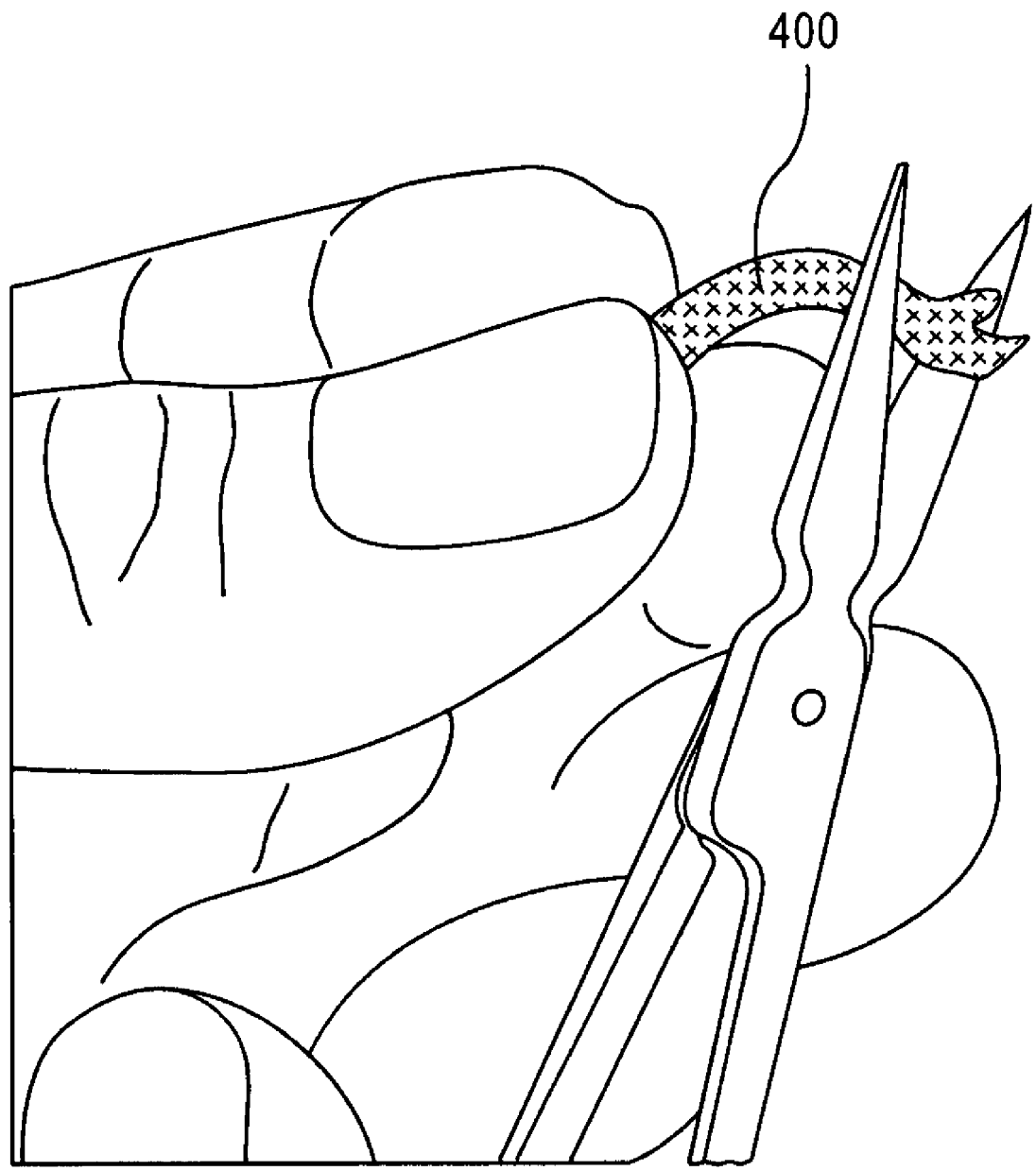
FIG. 4 is an image showing the venetian blind cord being cut to form the body tube.
Figure 5:
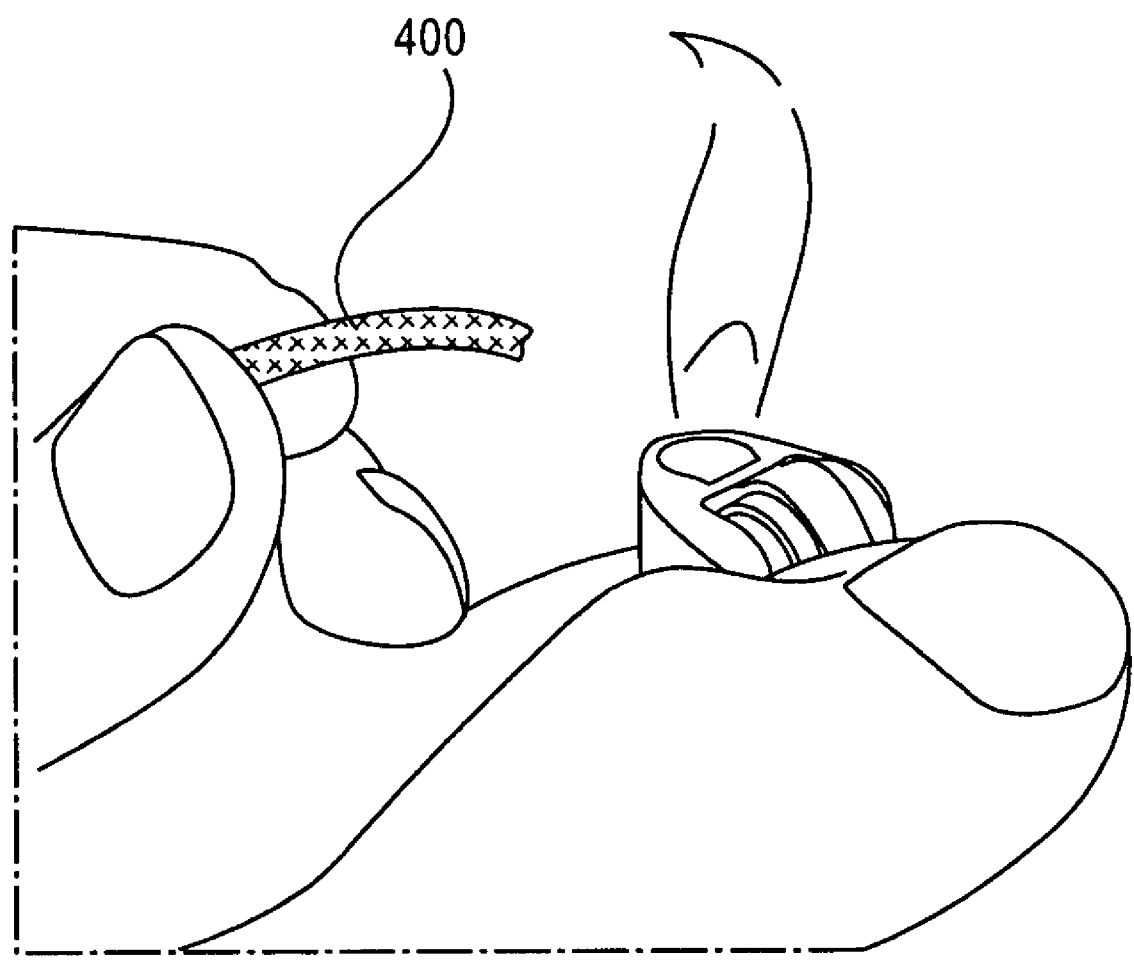
FIG. 5 is an image showing the ends of the body tube being seared and sealed.
Figure 6:
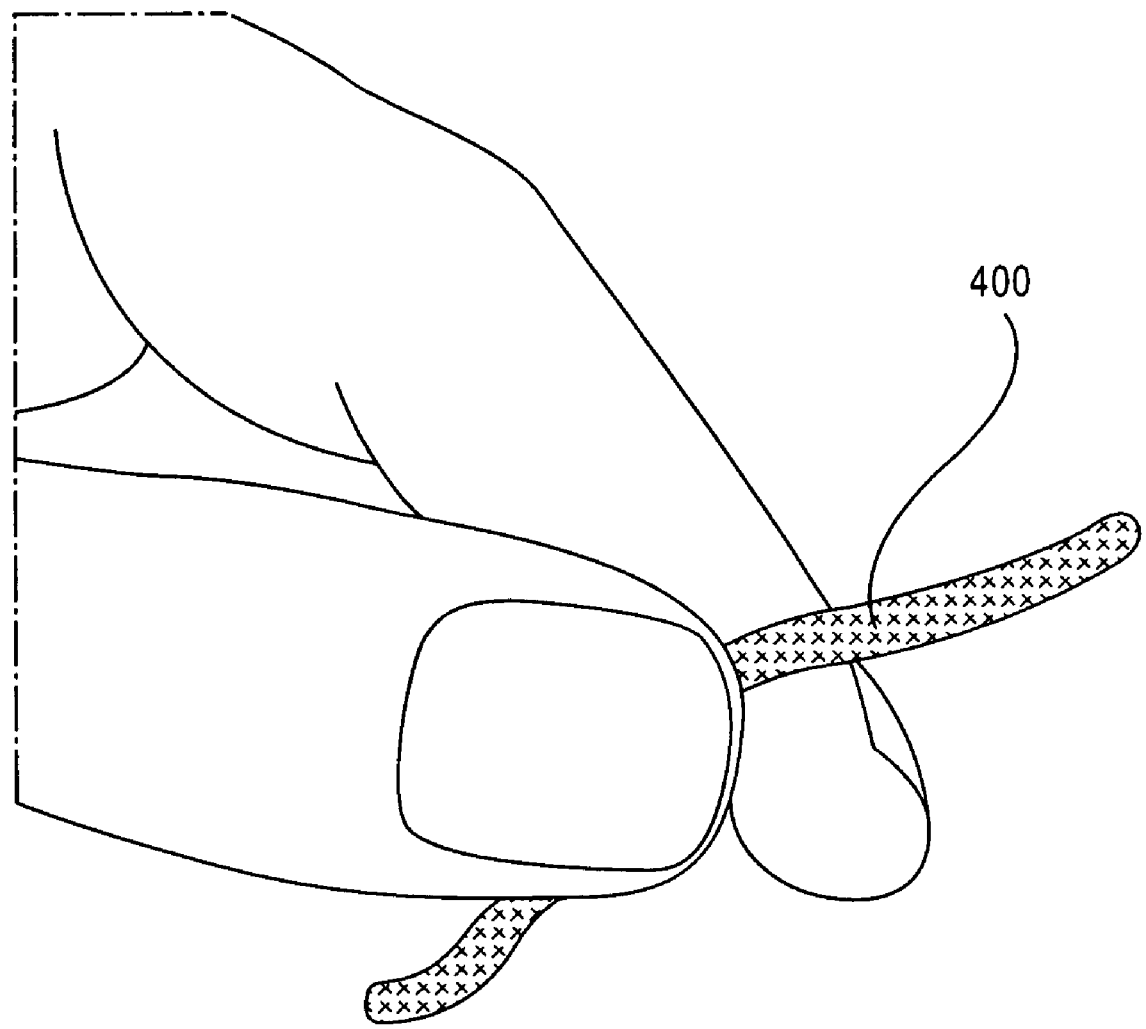
FIG. 6 is an image showing the ends of the body tube being sealed.

At step S1-4, the woven venetian blind is cut to the desired length of the fishing lure, See e.g., FIG. 4. The cut section 400 of the woven venetian blind forms the body tube and/or abdomen of the fishing lure.

Figure 7:
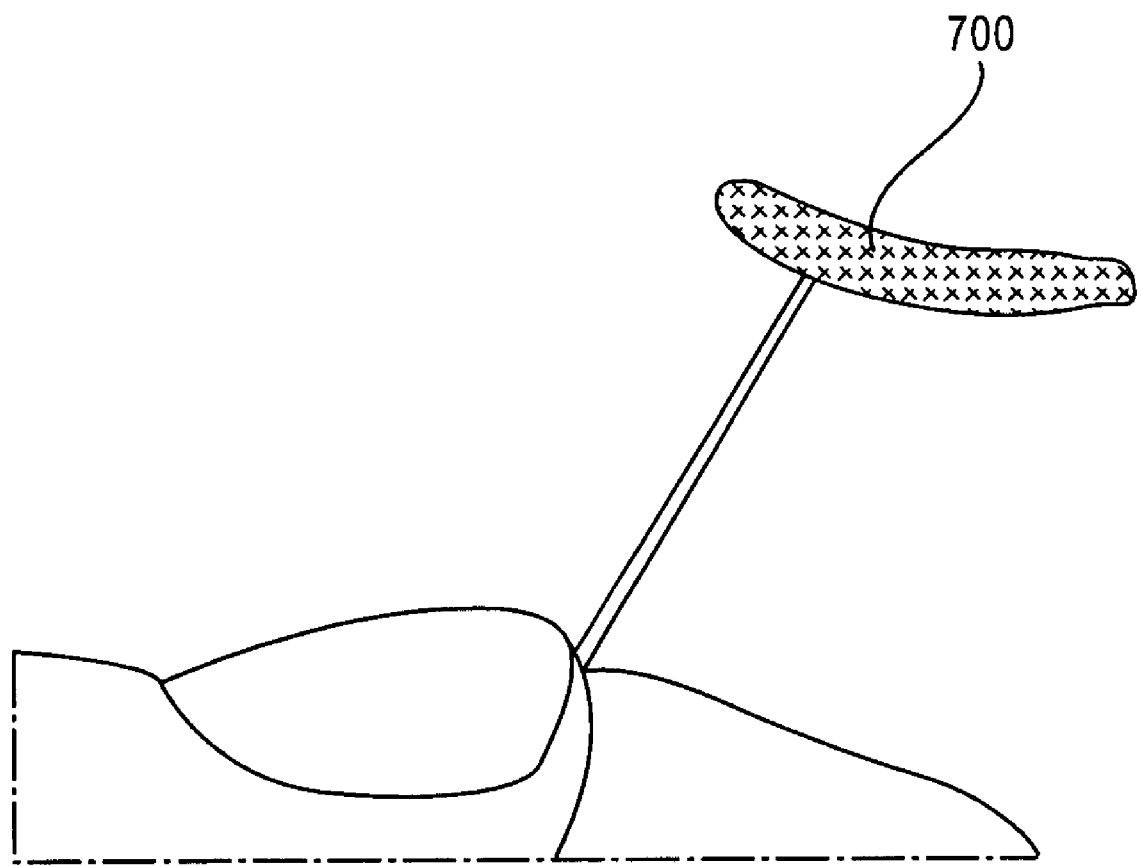
FIG. 7 is an image showing the body tube ready for coloring and tails.
Figure 8:
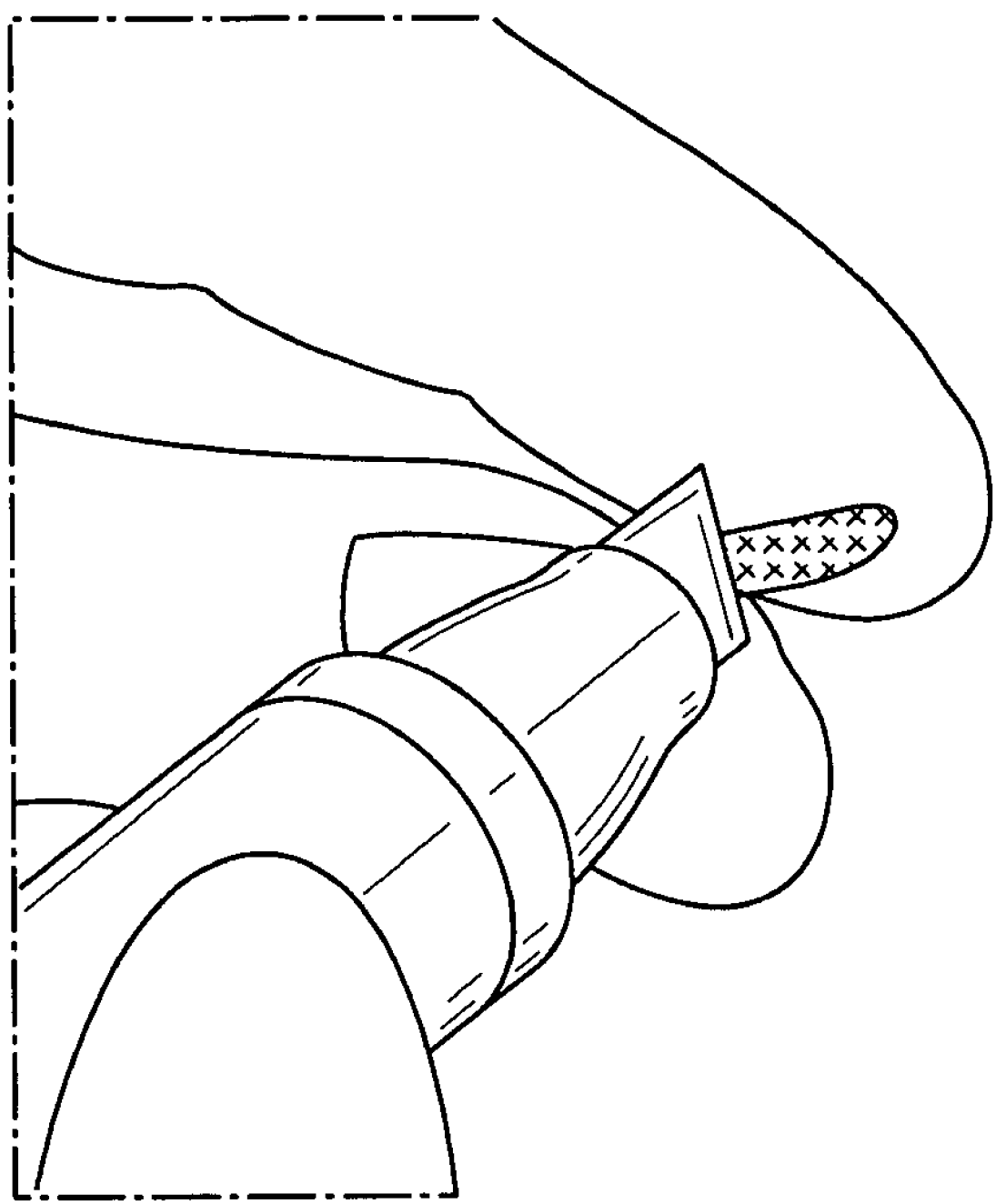
FIG. 8 is an image showing the body tube being colored.
Figure 9:
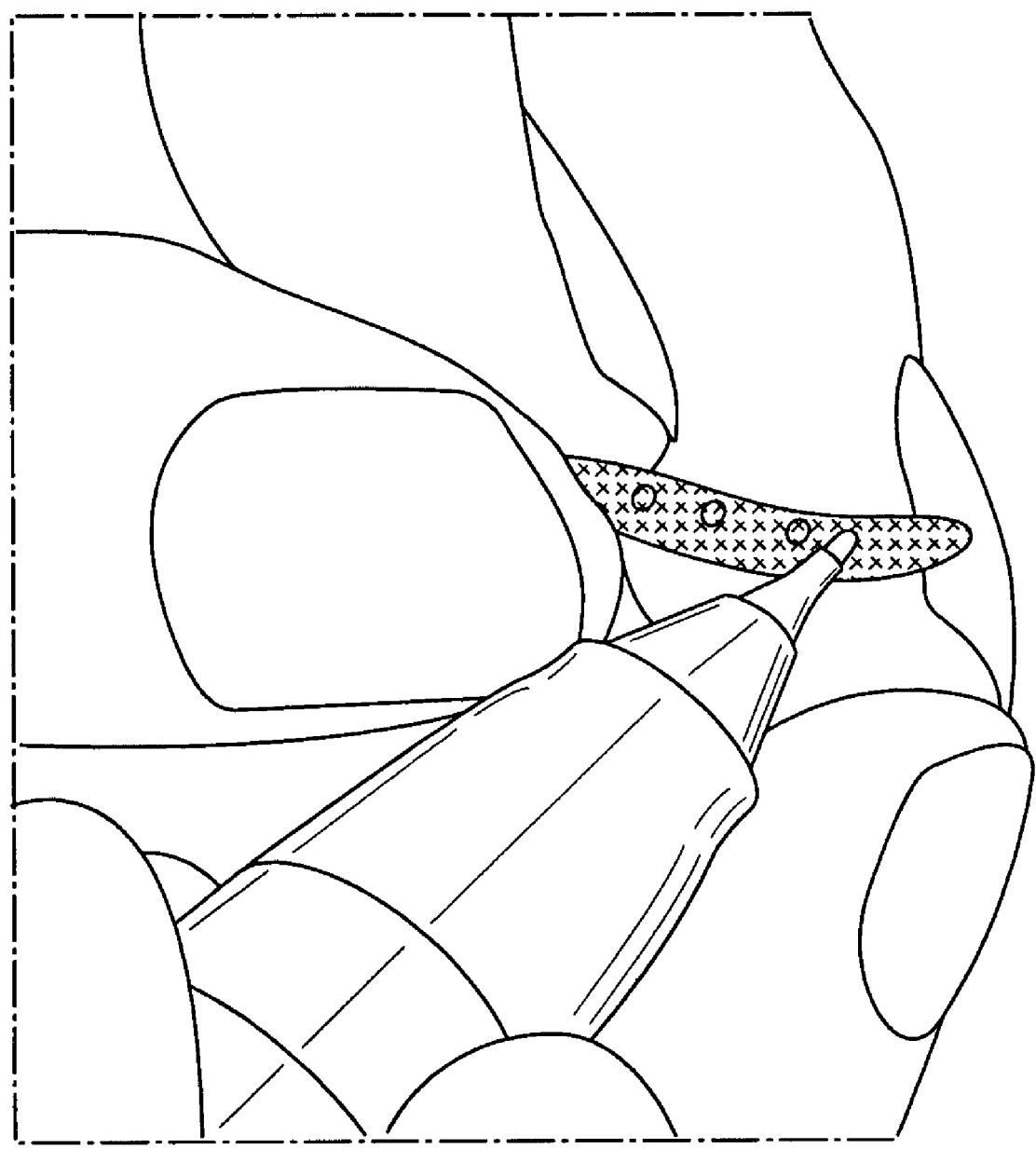
FIG. 9 is an image showing additional markings being added to the body tube.

At step S1-6, the ends of the body tube are sealed. According to one embodiment of the present invention, this step includes the application of heat. This heat may be applied in the form of open flame, See e.g., FIG. 5, radiant heat, or through the use of a hot iron or other such instrument to seal the ends of the cut section 400. According to one embodiment of the present invention, the sealing step S1-6 includes rolling the ends of the cut section 400, either between the thumb and fingers or in a mechanical apparatus, See e.g., FIG. 6. As shown in FIG. 7, the result is a translucent body tube or abdomen 700 that takes on the appearance and shape of an insect body or abdomen.

Figure 10:
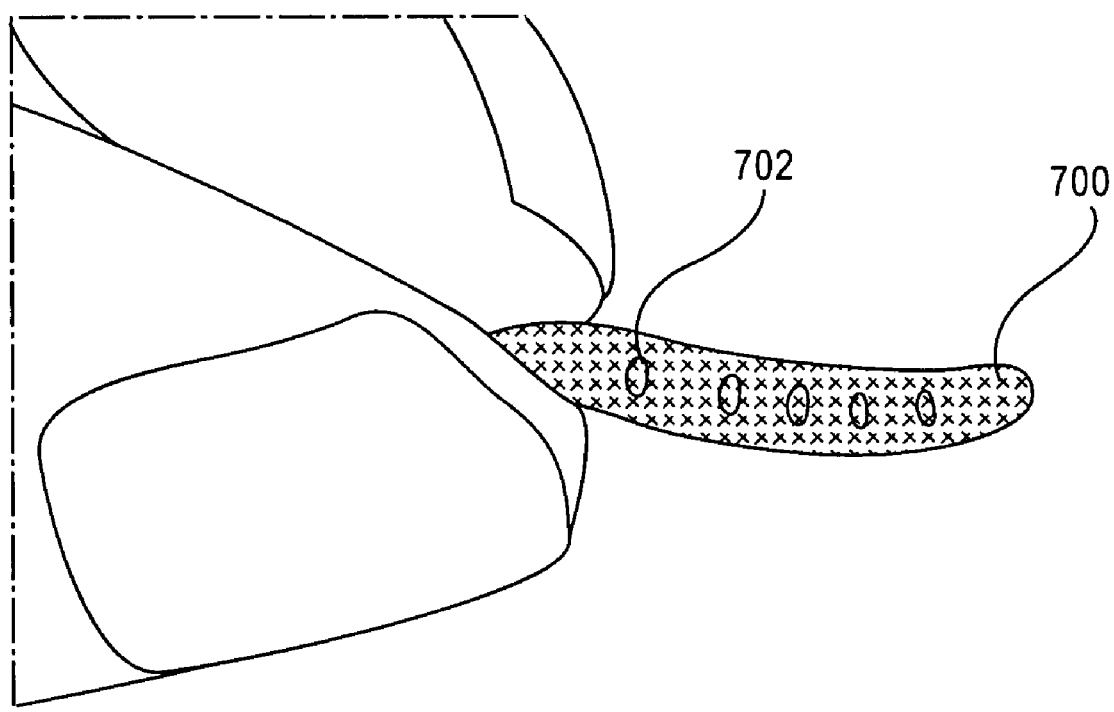
FIG. 10 is an image showing the body tube ready for tailing.

At step S1-8 the body tube is colored. See e.g., FIGS. 8 and 9, which show the manual application of ink to the tube 700. According to one embodiment of the invention, the body tube is colored using commercially available fluorescent markers, such as Prismacolor®. According to one embodiment of the present invention, the body tube is entirely colored using a base color, and fine-tipped marker is used to add tergite markings to the body tube. Markings 702 can also be added to the abdomen 700 as shown in FIG. 10. According to one embodiment of the present invention, the dye used to color the body tube can be diluted (e.g., with a suitable solvent such as alcohol) such that the dye does not penetrate to the inner surface of the hollow body tube. It is the inventor's belief that this method of coloring the body tube adds to the translucent and lifelike appearance of the lure.

Figure 11:
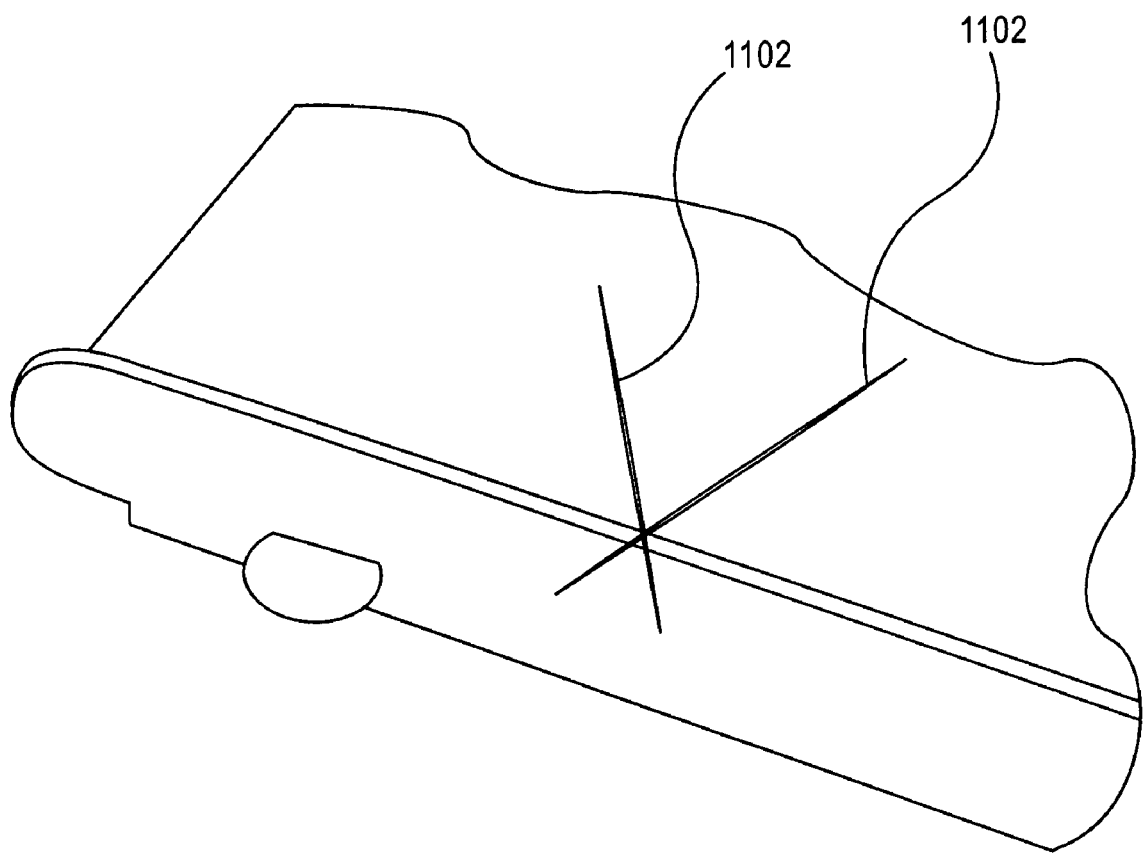
FIG. 11 is an image showing four microfibetts crossed and ready for fusing.
Figure 12:
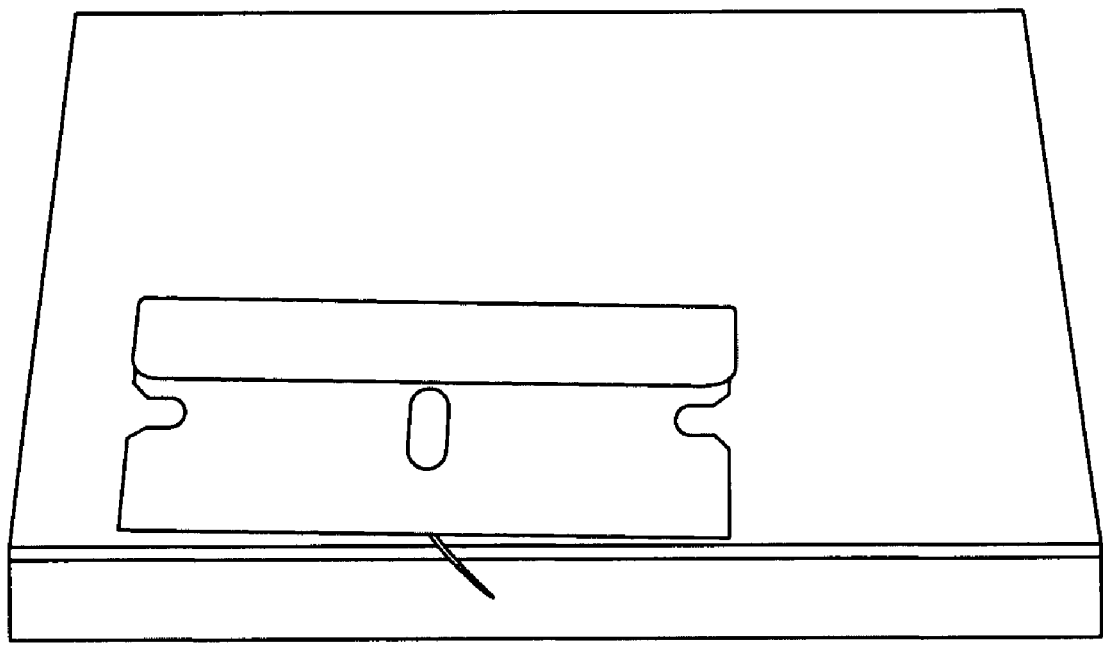
FIG. 12 is an image showing four microfibetts covered and ready for fusing.
Figure 13:
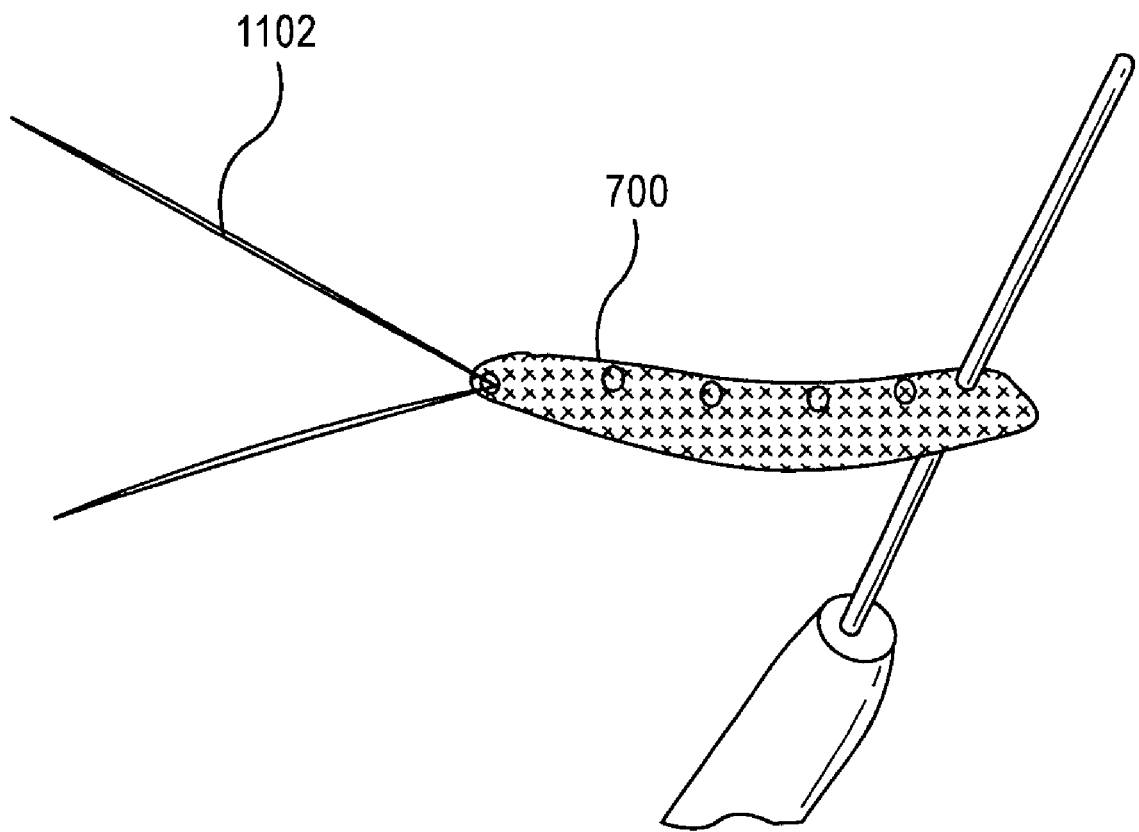
FIG. 13 is an image of the body tube with tails attached.

At step S1-10, the tails 1102 of the fishing lure are created by fusing tail material together. Preferably, microfibetts, a super thin synthetic fiber, or the like are fused together as shown in FIGS. 11 and 12. According to one embodiment of the present invention, four microfibetts are fused together to form a "V" shape pair of tails.

Figure 14:
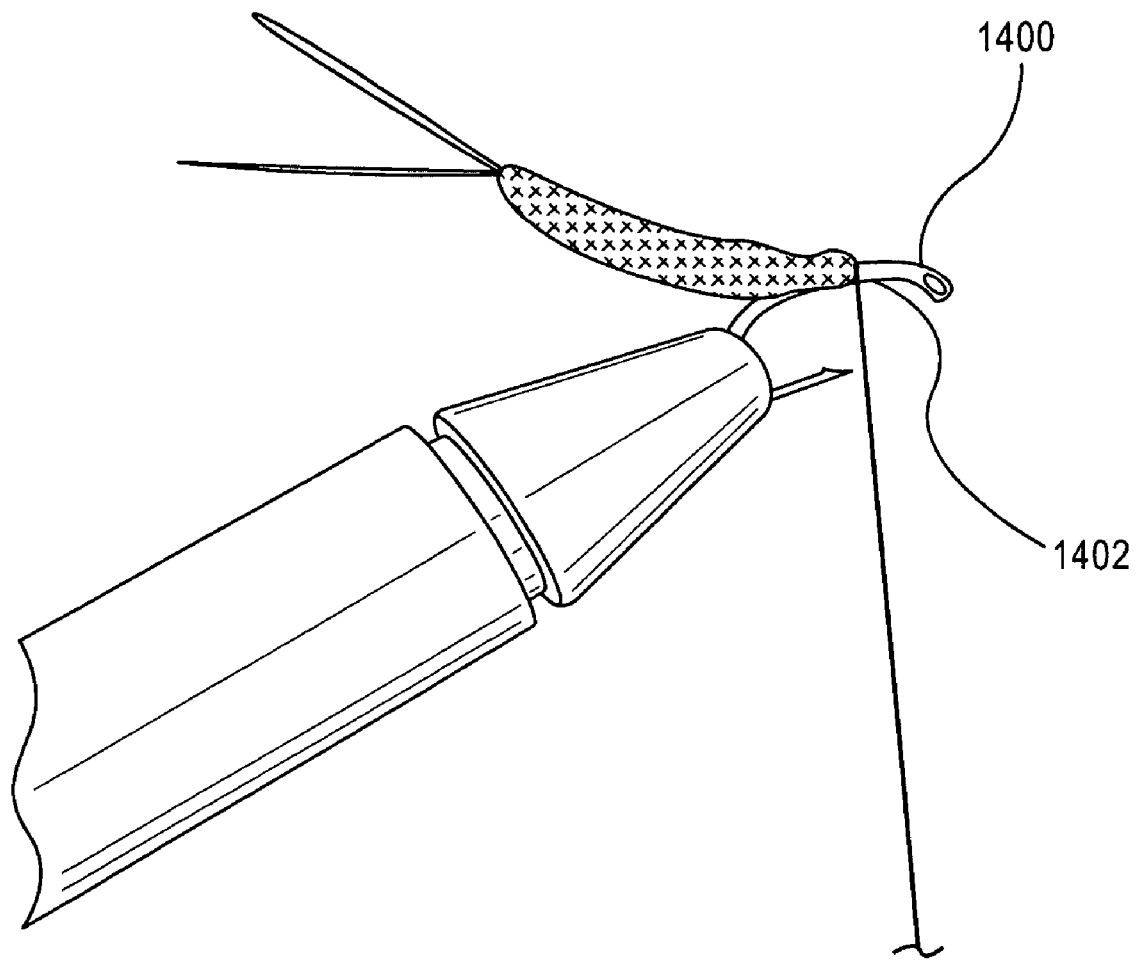
FIG. 14 is an image of a scud hook being attached to the body tube.

At step S1-12, the tails formed in step S1-10 are attached to one end of the body tube. See, e.g. FIG. 13, tails 1102 are to the tail end of the abdomen 700. At step S1-14, a hook is attached to the body tube 700 at the end opposite the tail end. As shown in FIG. 14, hook 1400 can be secured by conventional means. According to one embodiment of the current invention, the hook is a scud hook and is tied to the body tube in a way that leaves space for a post, or thorax area 1402. According to one embodiment of the present invention, the hook is tied to the body tube using a number of snug wraps and half hitches, preferably three.

Figure 15:
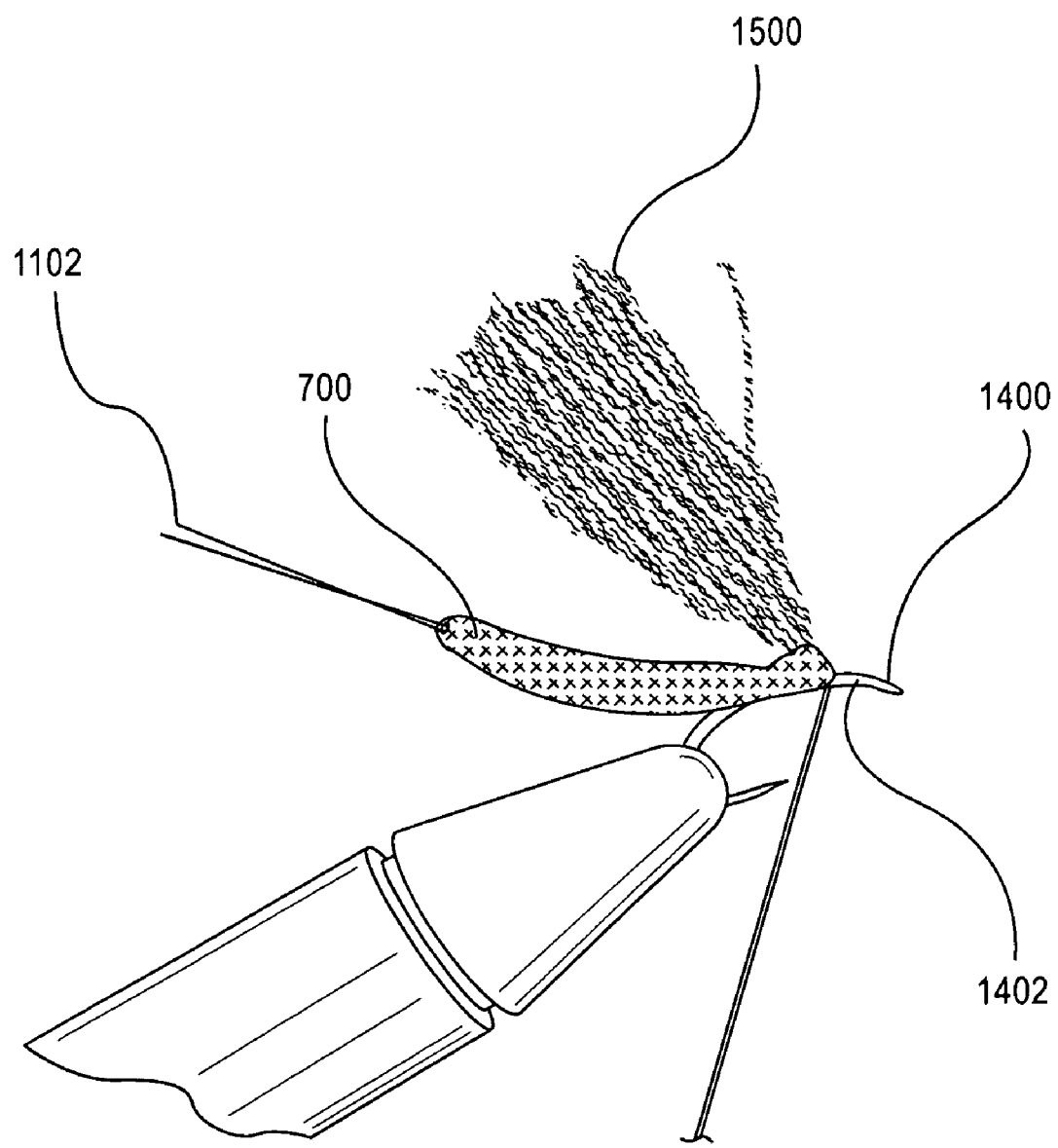
FIG. 15 is an image of wing material being attached to the body tube.

At step S1-16, wing material can be attached, preferably to the thorax area 1402 on the hook 1400. For example, FIG. 15 shows the wing material 1500 secured to the hook. According to one embodiment of the present invention, the wing material comprises a post of either deer hair or polypropylene that is tied to the body tube or hook.

Figure 16:
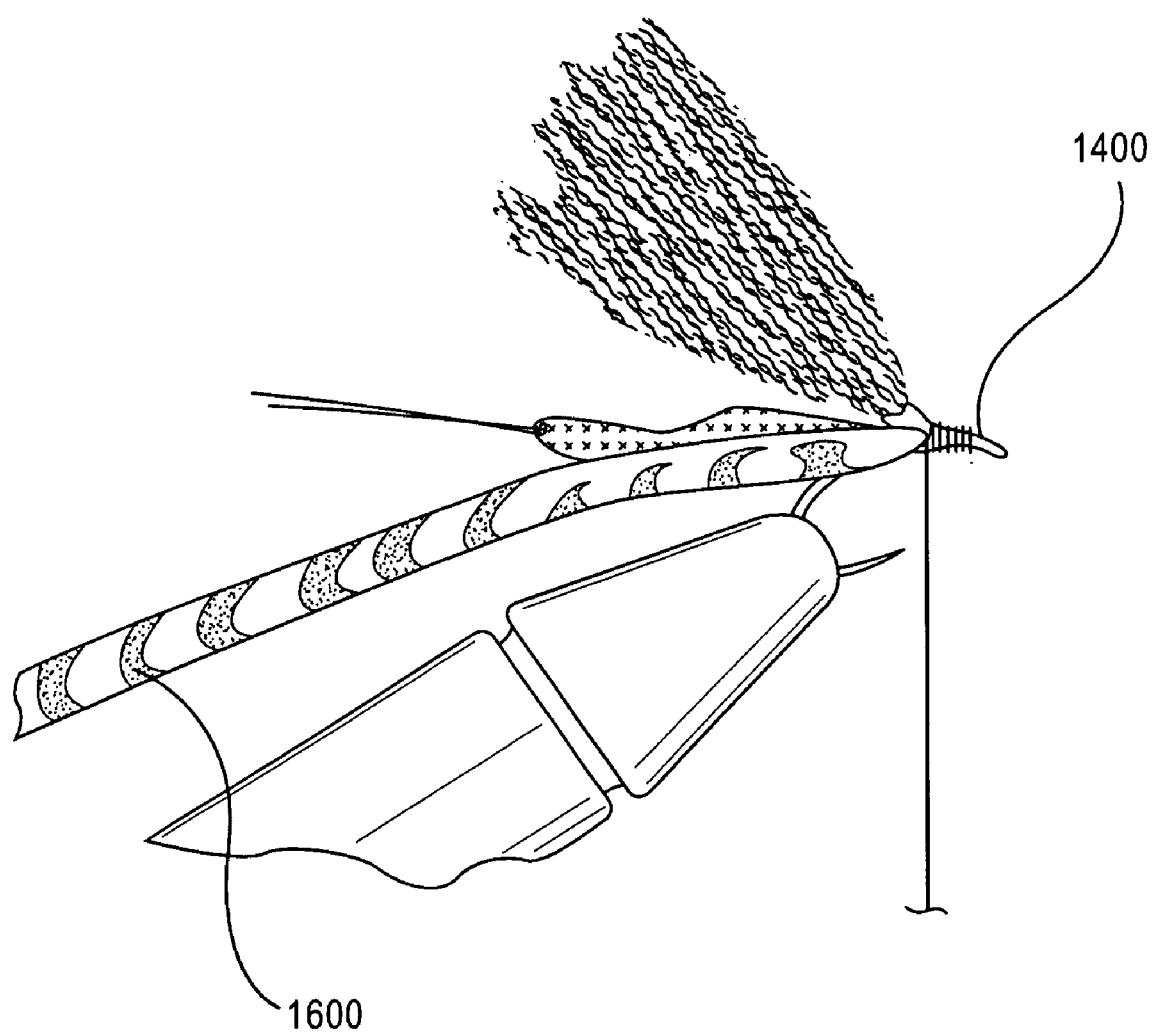
FIG. 16 is an image of a hackle being attached to the body tube.

At step S1-18, a hackle is attached at the base of the wing material. For example, FIG. 16 shows a hackle 1600 secured to the hook 1400 by thread. According to one embodiment of the current invention, the hackle is tied to the post of the wing material.

Figure 17:
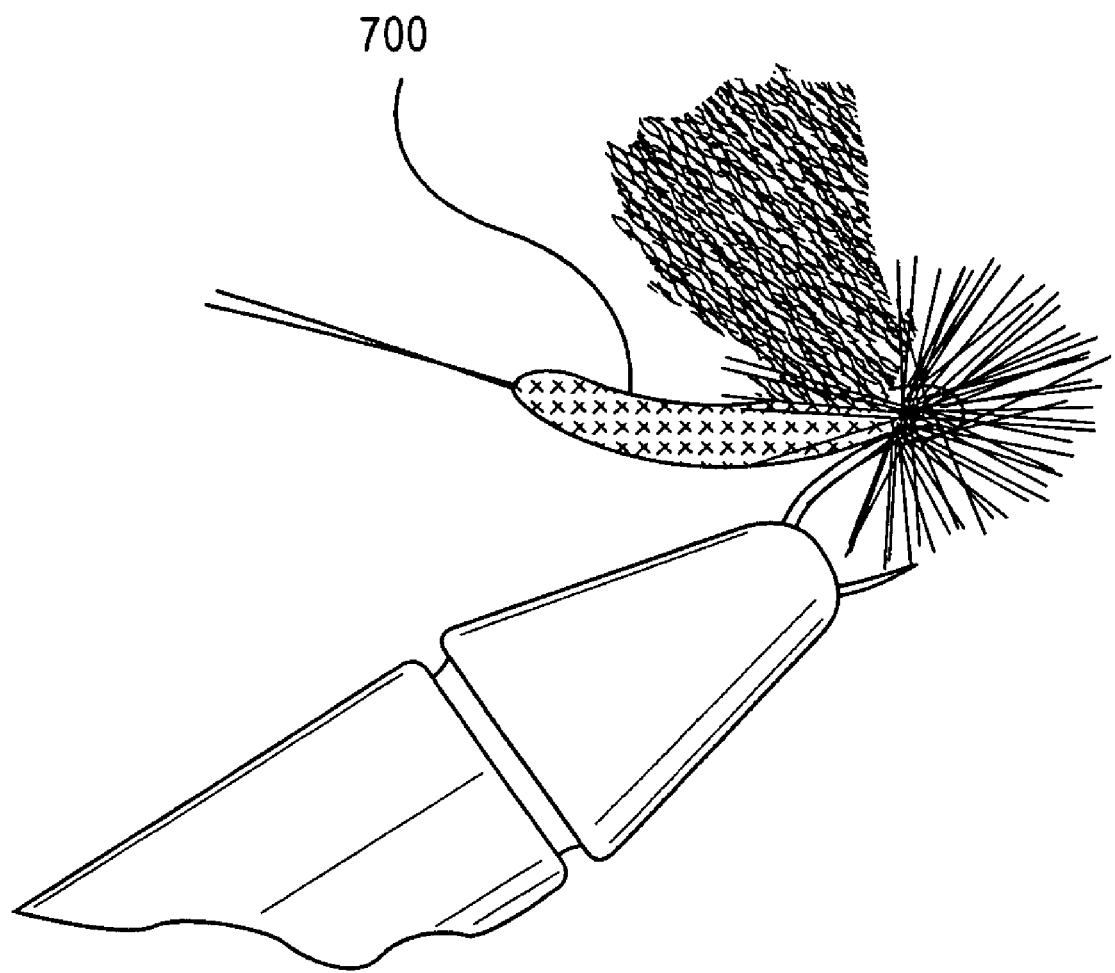
FIG. 17 is an image of a completed fishing lure.

At step S1-20, head cement is applied before and after wrapping the hackle. As shown in FIG. 17, the hackle 1600 has been wrapped and spread. According to one embodiment of the present invention, the hackle is wrapped parachute style. According to one embodiment of the present invention, the hackle is attached perpendicular to the wing. The cement adds strength and longevity to the fly.

At step S1-22, once the fly has been assembled, the wing can be trimmed to form the proper or desired silhouette, and likewise, the hackle can be trimmed to insure proper attitude on the surface of a body of water.

One skilled in the art should understand that the steps described above with reference to FIG. 1 are exemplary and are not intended to limit the present invention. One should understand that some steps can be omitted and steps could be added. Further, the steps need not be performed in the exact order as disclosed and the order in which they have been presented is not intended to limit the scope of the present invention in anyway.

FIGS. 18-27 are images of a number of known flies manufactured according to embodiments of the present invention. One skilled in the art should understand that the specific flies mentioned herein and shown in the figures are exemplary and are not intended to limit the present invention.

Figure 18:
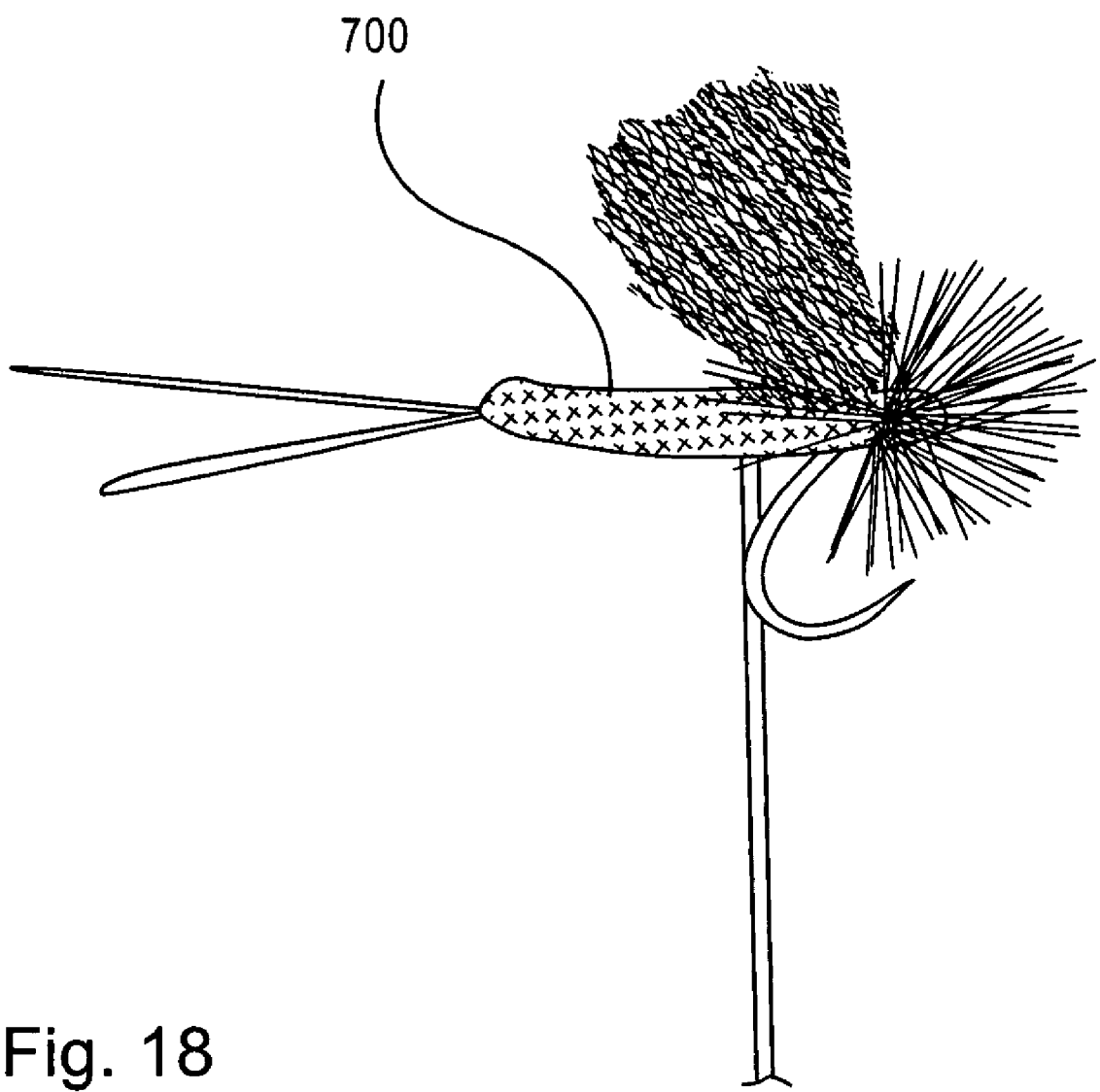
FIG. 18 is an image of a Lumidun Hendrickson Dun.
Figure 19:
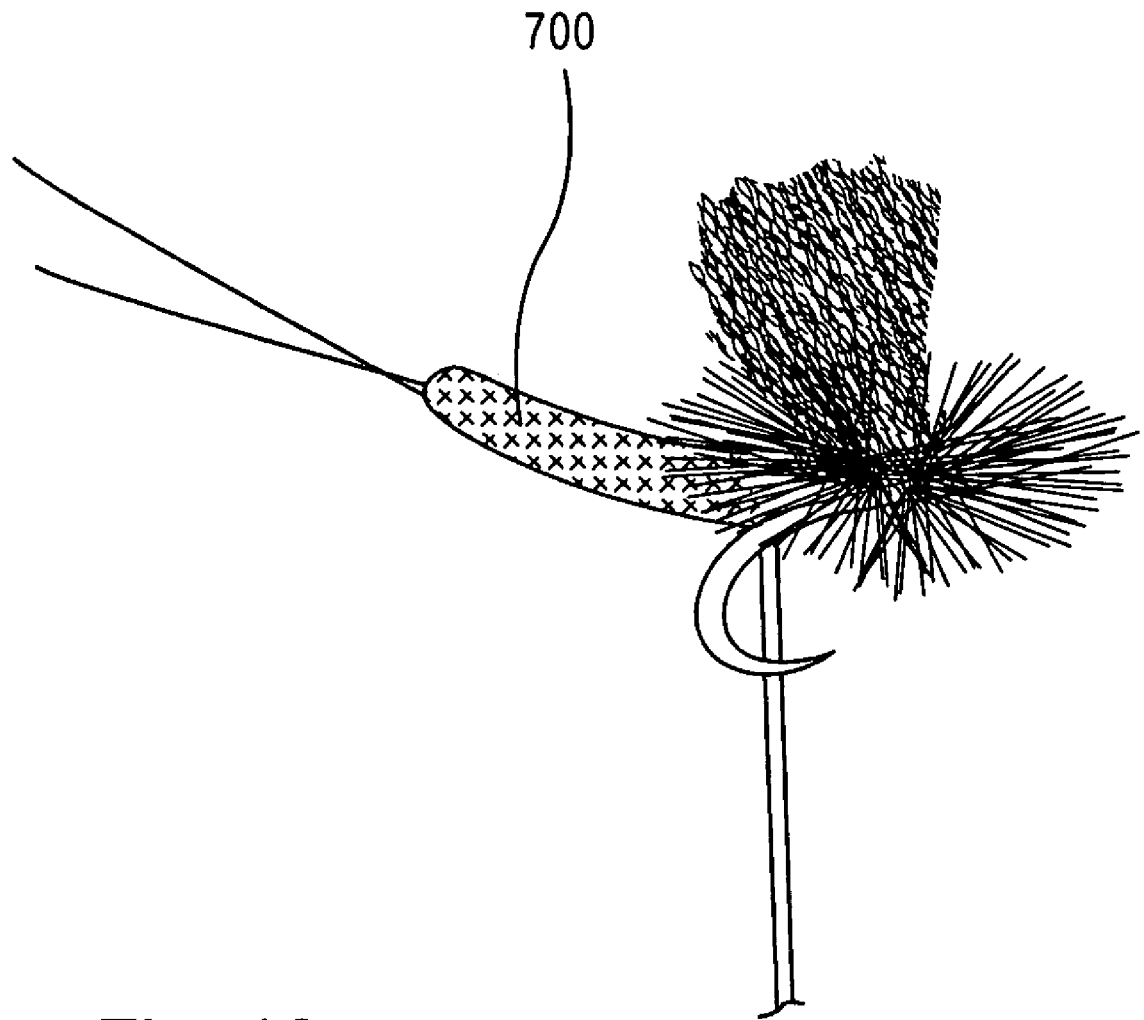
FIG. 19 is an image of a Lumidun Olive Dun.
Figure 20:
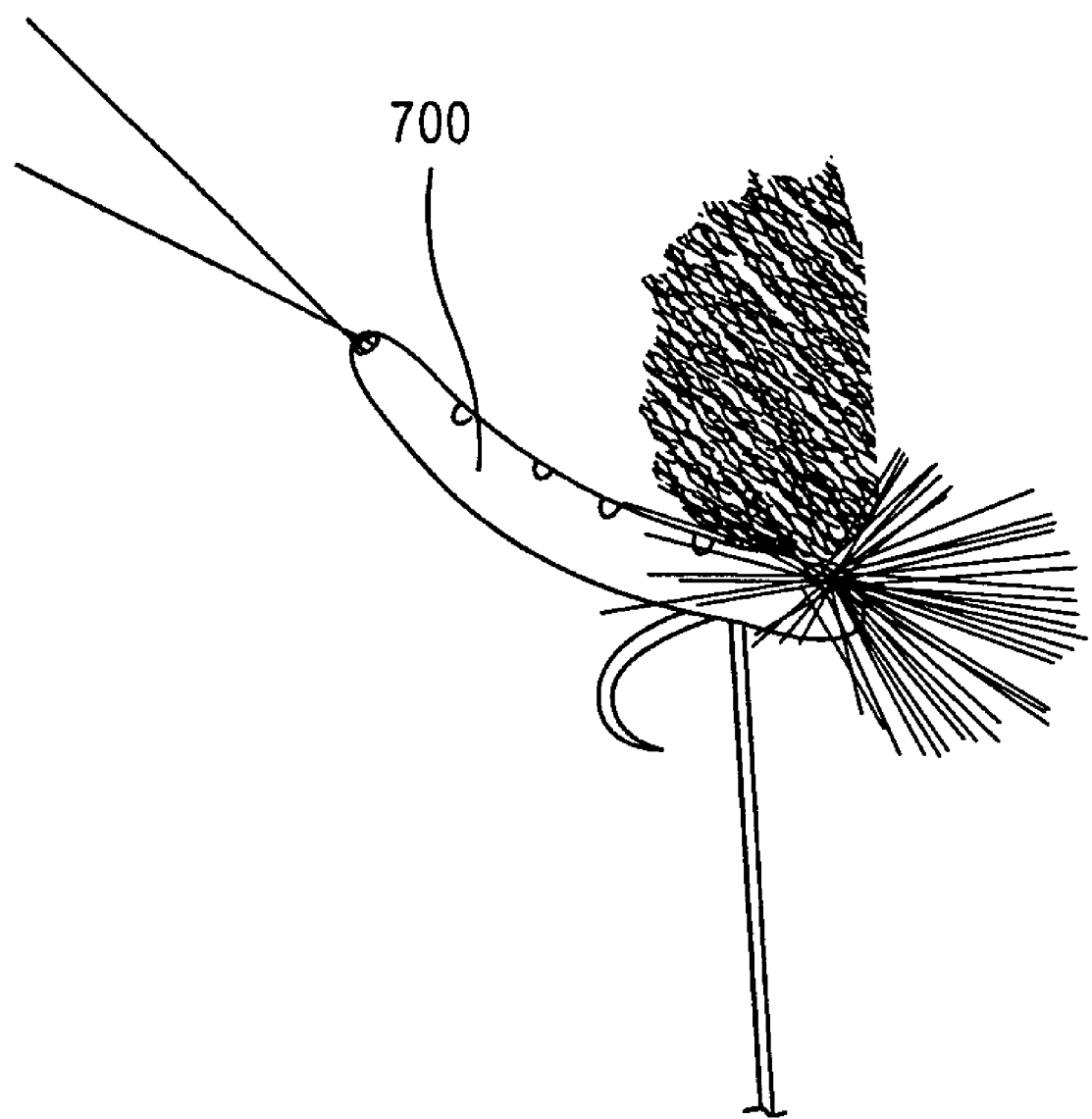
FIG. 20 is an image of a Lumidun March Brown Dun.
Figure 21:
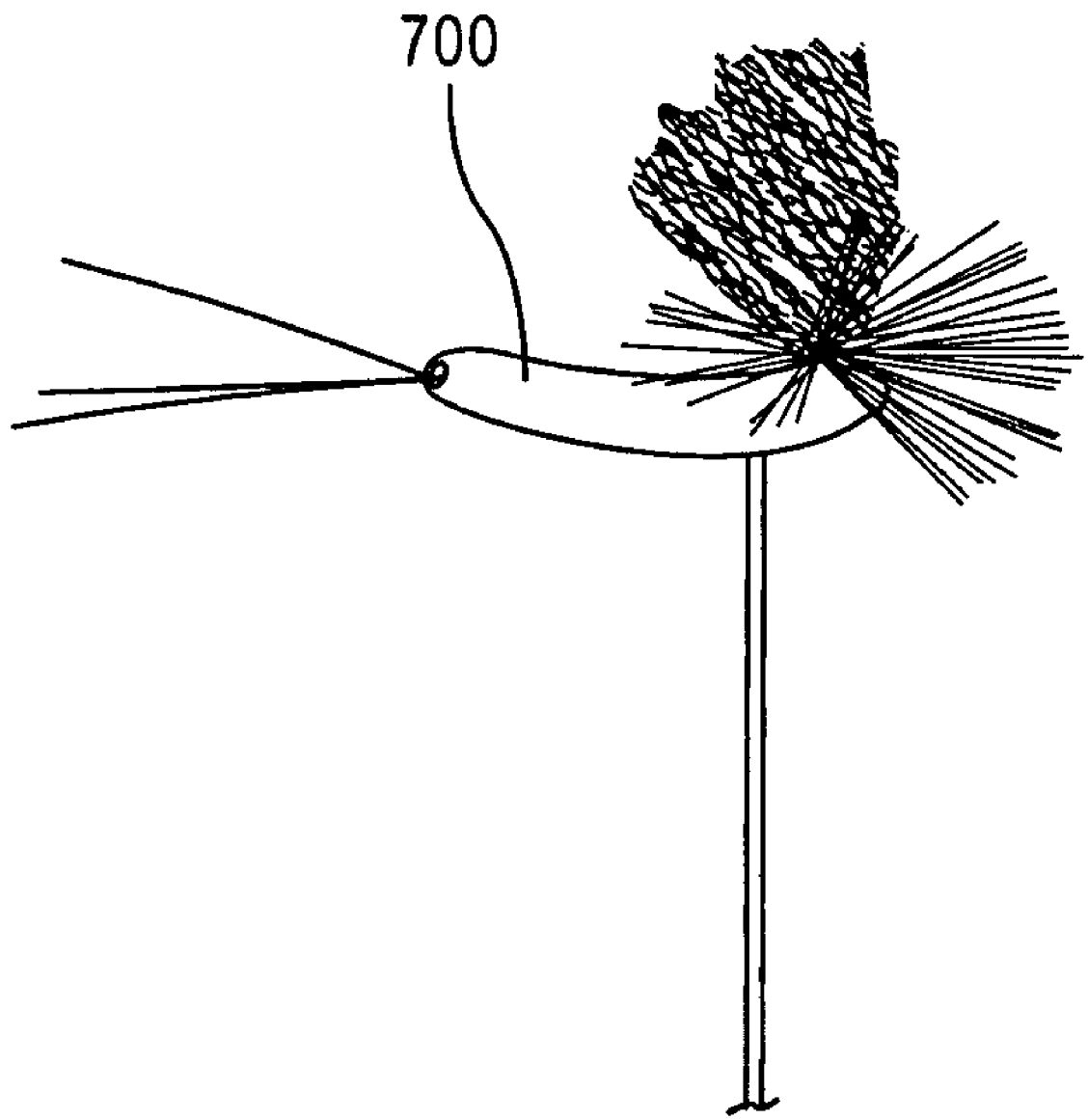
FIG. 21 is an image of a Lumidun Grey Fox Dun.
Figure 22:
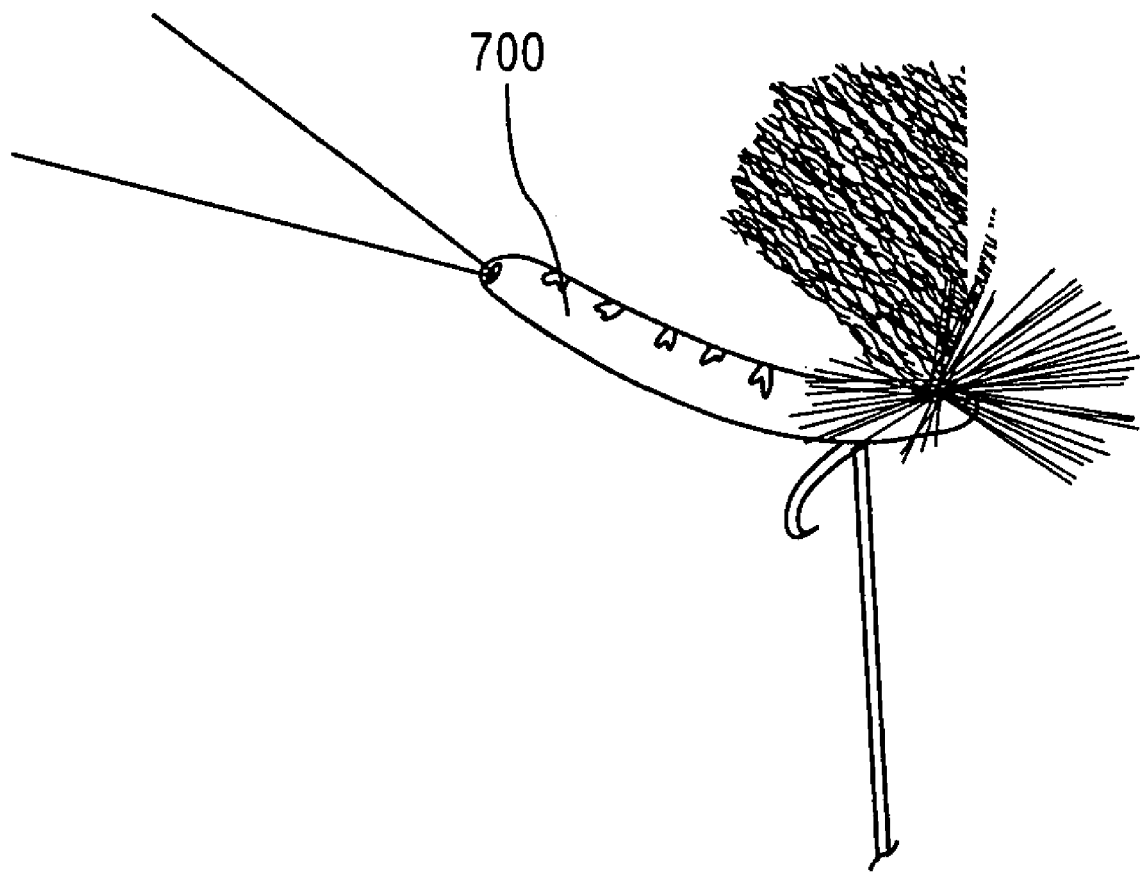
FIG. 22 is an image of a Lumidun Brown Drake Dun.
Figure 23:
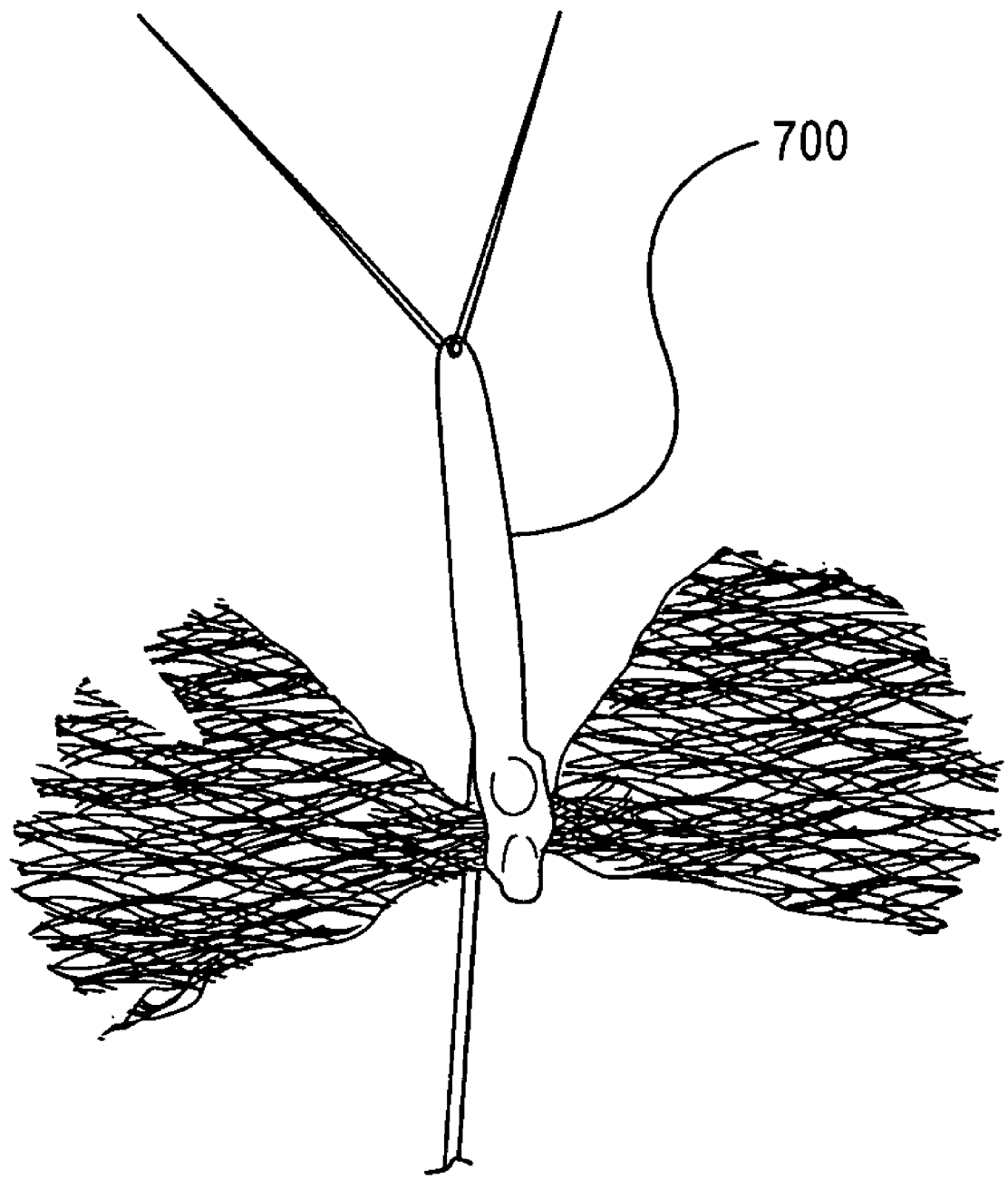
FIG. 23 is an image of a Lumidun Sulphur Spinner.
Figure 24:
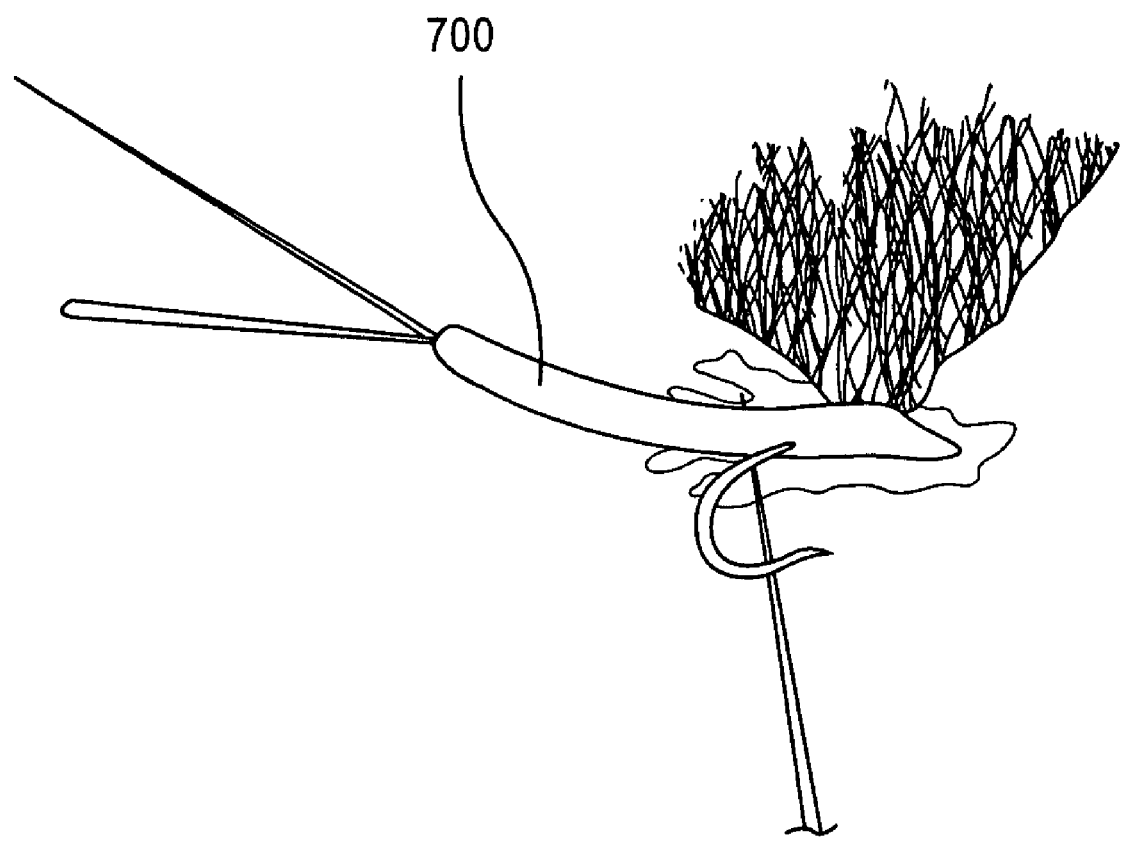
FIG. 24 is an image of a Lumidun White Fly Spinner.
Figure 25:
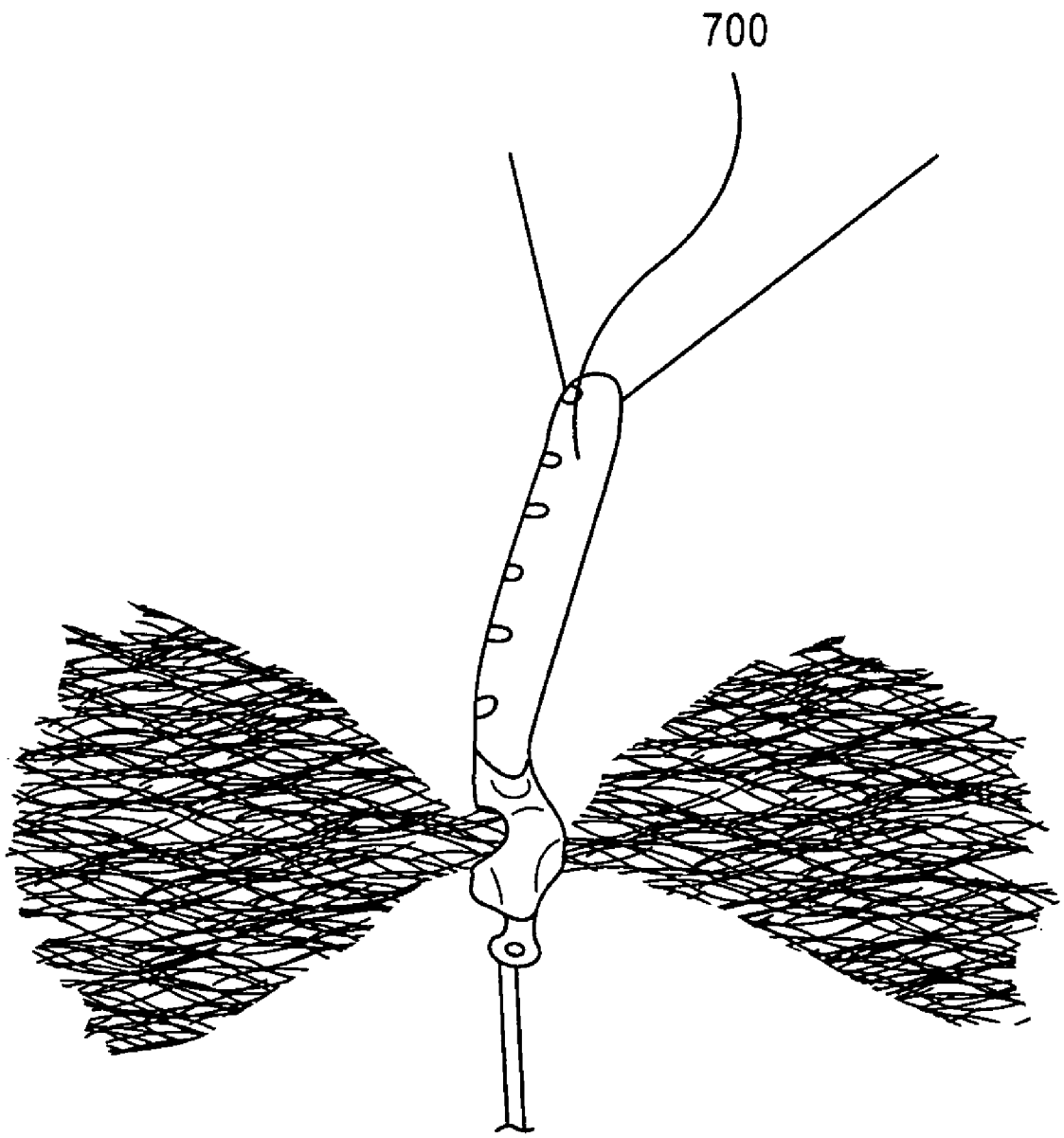
FIG. 25 is an image of a Lumidun Brown Drake Spinner.
Figure 26:
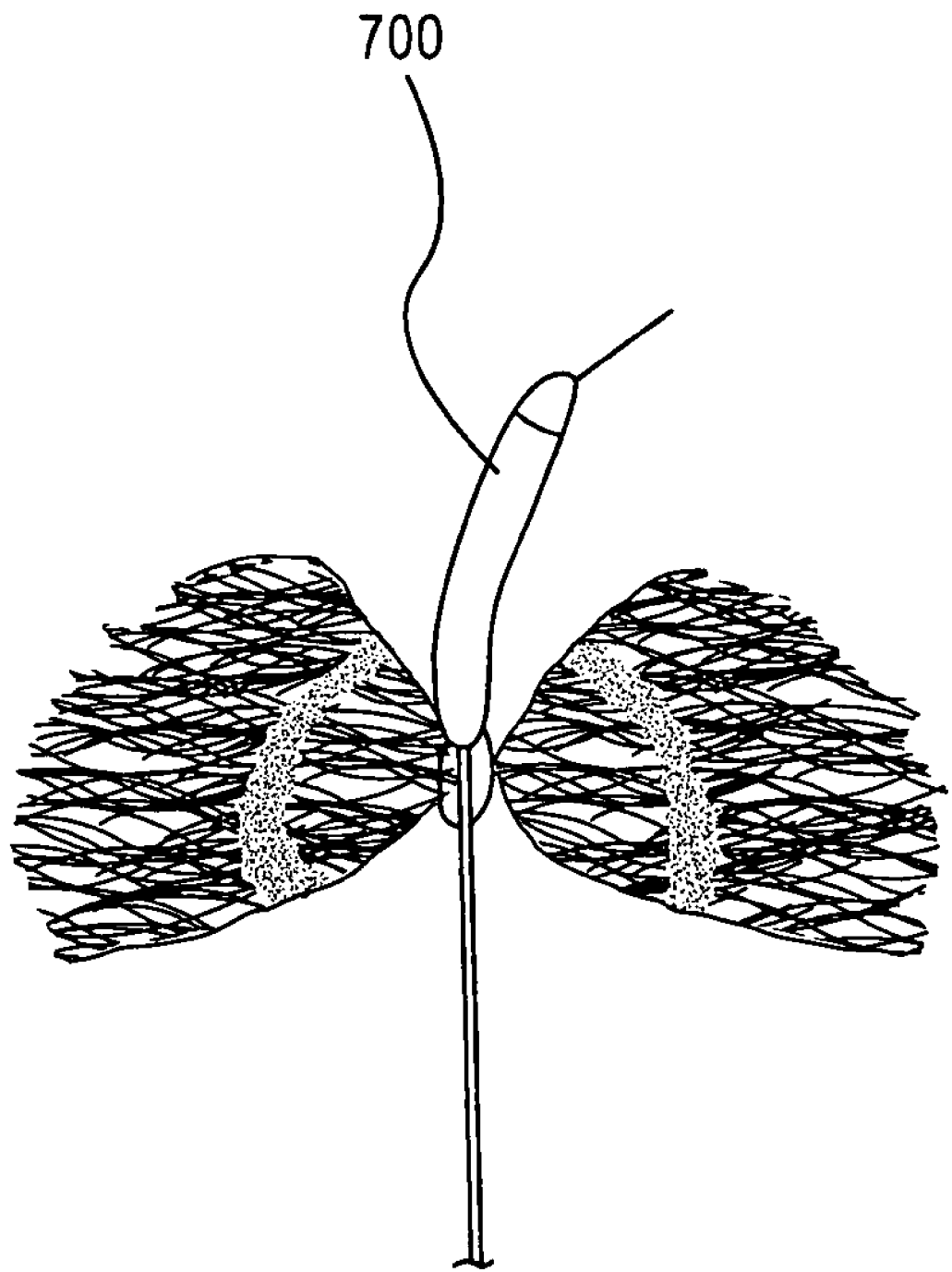
FIG. 26 is an image of a Lumidun Green Drake Spinner.
Figure 27:
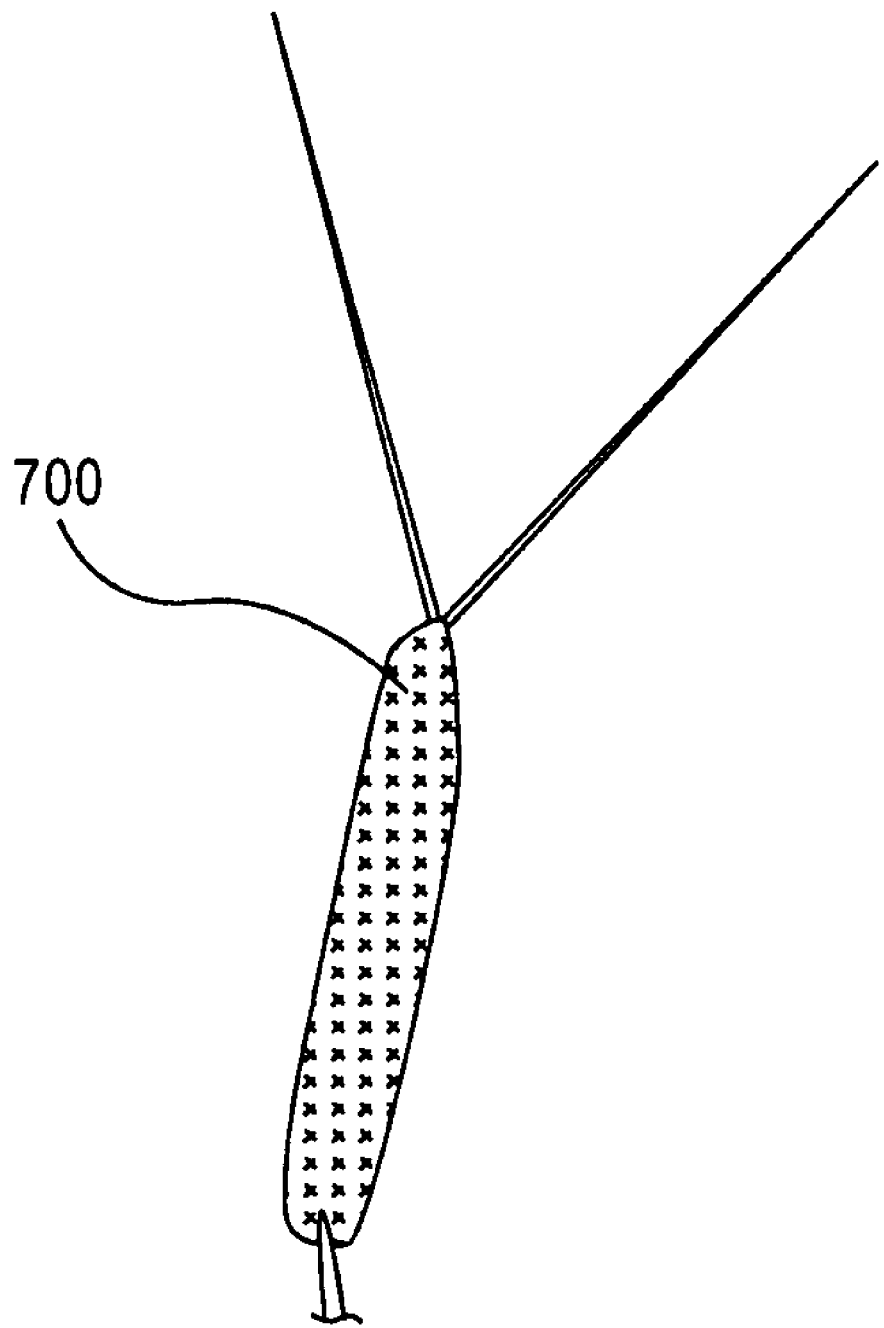
FIG. 27 is an image of a Lumidun Sulphur Dun Body.

FIG. 18 is an image of a Lumidun™ Hendrickson Dun according to an embodiment of the present invention. FIG. 19 is an image of a Lumidun™ Olive Dun according to an embodiment of the present invention. FIG. 20 is an image of a Lumidun™ March Brown Dun according to an embodiment of the present invention. FIG. 21 is an image of a Lumidun™ Grey Fox Dun according to an embodiment of the present invention. FIG. 22 is an image of a Lumidun™ Brown Drake Dun. FIG. 23 is an image of a Lumidun™ Sulphur Spinner according to an embodiment of the present invention. FIG. 24 is an image of a Lumidun™ White Fly Spinner according to an embodiment of the present invention. FIG. 25 is an image of a Lumidun™ Brown Drake Spinner according to an embodiment of the present invention. FIG. 26 is an image of a Lumidun™ Green Drake Spinner. FIG. 27 is an image of a Lumidun™ Sulphur Dun Body according to an embodiment of the present invention.

Figure 28:
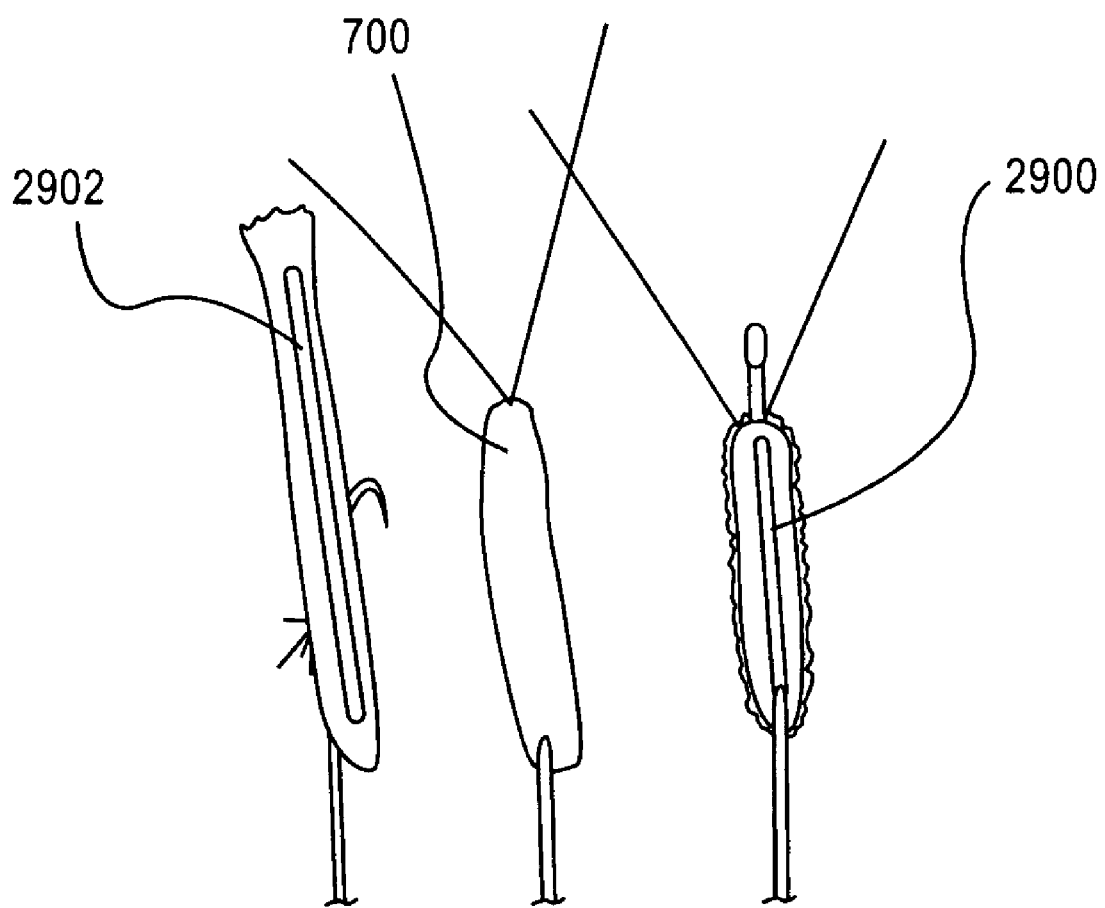
FIG. 28 is an image comparing a Lumidun Olive Dun Body with traditional fishing lure bodies.

FIG. 28 is an image comparing an abdomen 700 of a Lumidun™ Olive Dun with traditional fishing lure abdomens 2900 and 2902. As can be seen, the abdomen 700 is significantly brighter and has a superior look and shape than the traditional lure abdomens. Specifically, the light transmission characteristics of the Lumidun™ fly closely mimic those of a natural insect. Thus, abdomen 700 represents a quantum leap in mimicking naturally occurring insect characteristics in artificial lures.

Thus, a number of embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

I claim:

1. A fly-fishing fly abdomen comprising:
a section of curved, hollow, heat cured woven cord said section having first and second ends, said first and second ends being sealed, wherein said curved feature is maintained by said heat curing.

2. The fly-fishing fly abdomen of claim 1, further comprising:
a hook fixedly attached to said fly-fishing fly abdomen.

3. The fly-fishing fly abdomen of claim 1, further comprising:
tails fixedly attached to one end of said fly-fishing fly abdomen.

4. The fly-fishing fly abdomen of claim 2, further comprising:
wing material fixedly attached to either said hook or said fly-fishing fly abdomen.

5. The fly-fishing abdomen of claim 1, further comprising:
a hackle fixedly attached to either said hook or said fly-fishing fly abdomen.

6. The fly-fishing fly abdomen of claim 1, wherein said fly-fishing fly abdomen is colored.

7. The fly-fishing fly abdomen of claim 6, wherein said fly-fishing fly abdomen is colored by at least one of fluorescent and colored ink.

8. The fly-fishing fly abdomen of claim 1, wherein said fly-fishing fly abdomen is marked to mimic insect markings.

9. The fly-fishing fly abdomen of claim 1, wherein said fly-fishing fly abdomen is substantially translucent.

* * * * *